United States Patent
Smith et al.

(10) Patent No.: US 11,718,288 B2
(45) Date of Patent: Aug. 8, 2023

(54) CONSENSUS-BASED TRANSPORT EVENT SEVERITY

(71) Applicant: TOYOTA MOTOR NORTH AMERICA, INC., Plano, TX (US)

(72) Inventors: Lucas Smith, Frisco, TX (US); Jay Bartholomew, McKinney, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/827,589

(22) Filed: Mar. 23, 2020

(65) Prior Publication Data

US 2021/0291815 A1    Sep. 23, 2021

(51) Int. Cl.
*B60W 30/08*   (2012.01)
*B60W 40/08*   (2012.01)
*B60W 50/00*   (2006.01)

(52) U.S. Cl.
CPC ............. *B60W 30/08* (2013.01); *B60W 40/08* (2013.01); *B60W 2030/082* (2013.01); *B60W 2050/0004* (2013.01); *B60W 2050/0075* (2013.01); *B60W 2540/221* (2020.02); *B60W 2556/45* (2020.02)

(58) Field of Classification Search
CPC .................. B60W 30/08; B60W 40/08; B60W 2540/221; B60W 2030/082; B60W 2050/0004; B60W 2050/0077
USPC ........................................................ 701/31.4
See application file for complete search history.

(56) References Cited

U.S. PATENT DOCUMENTS

| | | |
|---|---|---|
| 1,008,355 A | 11/1911 | Morris |
| 7,068,211 B2 | 6/2006 | Oswald et al. |
| 7,102,496 B1 | 9/2006 | Ernst, Jr. et al. |
| 7,103,460 B1 | 9/2006 | Breed |
| 7,268,700 B1 | 9/2007 | Hoffberg |
| 7,284,769 B2 | 10/2007 | Breed |
| 7,330,103 B2 | 2/2008 | Boss et al. |
| 7,348,895 B2 | 3/2008 | Lagassey |
| 7,385,486 B2 | 6/2008 | Danz et al. |
| 7,899,616 B2 | 3/2011 | Breed |
| 8,068,979 B2 | 11/2011 | Breed |
| 8,139,820 B2 | 3/2012 | Plante et al. |
| 8,344,864 B1 | 1/2013 | Al-Mutawa |

(Continued)

FOREIGN PATENT DOCUMENTS

| | | |
|---|---|---|
| CA | 2809689 A1 | 9/2014 |
| CN | 105835878 A | 8/2016 |

(Continued)

OTHER PUBLICATIONS

EP search report issued in a related EP Application, dated Aug. 31, 2021.

(Continued)

*Primary Examiner* — Jeff A Burke
*Assistant Examiner* — Jerrod Irvin Davis

(57) ABSTRACT

An example operation includes one or more of determining, by a server, an event associated with a transport, receiving, by the server, atypical data related to the transport from a plurality of devices over various times prior to the event, analyzing, by the server, the atypical data, forming, by the server, a consensus based on the analyzed atypical data to determine a severity of the event, and determining, by the server, an action to take based on the severity.

17 Claims, 25 Drawing Sheets

130

(56) References Cited

U.S. PATENT DOCUMENTS

| | | | |
|---|---|---|---|
| 8,395,529 B2 | 3/2013 | Seder et al. | |
| 8,725,309 B2 | 5/2014 | Kubotani et al. | |
| 8,983,771 B2 | 3/2015 | Breed | |
| 9,509,957 B2 | 11/2016 | Higgins-Luthman et al. | |
| 9,773,281 B1* | 9/2017 | Hanson | H04W 4/023 |
| 9,797,178 B2 | 10/2017 | Elie et al. | |
| 9,799,206 B1 | 10/2017 | Horn | |
| 9,805,601 B1 | 10/2017 | Fields et al. | |
| 9,903,733 B2 | 2/2018 | Bai et al. | |
| 9,922,374 B1 | 3/2018 | Vose et al. | |
| 9,983,013 B1 | 5/2018 | Krunic et al. | |
| 10,026,237 B1 | 7/2018 | Fields et al. | |
| 10,049,566 B2 | 8/2018 | Shanahan | |
| 10,096,038 B2 | 10/2018 | Ramirez et al. | |
| 10,133,530 B2 | 11/2018 | Wasserman | |
| 10,181,160 B1 | 1/2019 | Hakimi-Boushehri et al. | |
| 10,216,194 B1 | 2/2019 | Hayward | |
| 10,235,880 B2 | 3/2019 | Seo | |
| 10,300,876 B1 | 5/2019 | Jacob et al. | |
| 10,332,320 B2 | 6/2019 | Lakshamanan et al. | |
| 10,336,343 B1 | 7/2019 | Fiedler et al. | |
| 10,395,332 B1 | 8/2019 | Konrardy et al. | |
| 10,417,914 B1 | 9/2019 | Vose et al. | |
| 10,531,266 B2 | 1/2020 | Rauner | |
| 10,713,727 B1* | 7/2020 | Floyd | G07C 5/085 |
| 10,759,442 B2* | 9/2020 | Stenneth | G07C 5/008 |
| 10,777,024 B1* | 9/2020 | Brinkmann | G06F 17/00 |
| 10,810,880 B1 | 10/2020 | Schweitzer et al. | |
| 10,832,338 B1 | 11/2020 | Floyd et al. | |
| 10,891,694 B1* | 1/2021 | Leise | G06Q 40/08 |
| 2005/0065711 A1 | 3/2005 | Dahlgren et al. | |
| 2008/0147253 A1 | 6/2008 | Breed | |
| 2009/0240394 A1 | 9/2009 | He et al. | |
| 2010/0019932 A1 | 1/2010 | Goodwin | |
| 2011/0260848 A1 | 10/2011 | Barros et al. | |
| 2012/0065858 A1 | 3/2012 | Nickolaou et al. | |
| 2012/0194356 A1 | 8/2012 | Haines et al. | |
| 2013/0096731 A1 | 4/2013 | Tamari et al. | |
| 2013/0187792 A1 | 7/2013 | Egly | |
| 2013/0222133 A1* | 8/2013 | Schultz | H04W 4/021 340/539.13 |
| 2013/0279491 A1 | 10/2013 | Rubin et al. | |
| 2014/0058761 A1 | 2/2014 | Freiberger et al. | |
| 2014/0118130 A1 | 5/2014 | Chang et al. | |
| 2014/0279707 A1 | 9/2014 | Joshua et al. | |
| 2014/0327752 A1 | 11/2014 | Tsuda | |
| 2015/0011614 A1 | 1/2015 | Ward et al. | |
| 2015/0116114 A1 | 4/2015 | Boyles | |
| 2015/0145991 A1 | 5/2015 | Russell et al. | |
| 2015/0161892 A1 | 6/2015 | Oremus | |
| 2015/0228195 A1 | 8/2015 | Beaurepaire et al. | |
| 2015/0230042 A1 | 8/2015 | McGuire | |
| 2015/0250042 A1 | 9/2015 | Aggarwal et al. | |
| 2015/0310742 A1 | 10/2015 | Albornoz | |
| 2015/0338235 A1 | 11/2015 | Schmidt et al. | |
| 2015/0344038 A1 | 12/2015 | Stenneth et al. | |
| 2016/0054736 A1 | 2/2016 | Kolhouse et al. | |
| 2016/0071418 A1 | 3/2016 | Oshida et al. | |
| 2016/0133131 A1 | 5/2016 | Grimm et al. | |
| 2016/0150070 A1 | 5/2016 | Goren et al. | |
| 2016/0163198 A1 | 6/2016 | Dougherty | |
| 2016/0275790 A1 | 9/2016 | Kang et al. | |
| 2016/0284212 A1* | 9/2016 | Tatourian | G08G 1/096775 |
| 2016/0364921 A1 | 12/2016 | Iyoda et al. | |
| 2017/0068863 A1 | 3/2017 | Rattner et al. | |
| 2017/0169625 A1 | 6/2017 | Lavie et al. | |
| 2017/0234689 A1 | 8/2017 | Gibson et al. | |
| 2017/0243485 A1 | 8/2017 | Rubin et al. | |
| 2017/0256147 A1 | 9/2017 | Shanahan | |
| 2018/0211524 A1* | 7/2018 | Furuichi | G08G 1/096716 |
| 2018/0239359 A1 | 8/2018 | Jian | |
| 2018/0299284 A1 | 10/2018 | Wang | |
| 2018/0299287 A1 | 10/2018 | Brush et al. | |
| 2018/0342036 A1* | 11/2018 | Zachary | H04W 4/44 |
| 2019/0033862 A1* | 1/2019 | Groden | G05D 1/0072 |
| 2019/0047493 A1 | 2/2019 | Chierichetti et al. | |
| 2019/0102840 A1 | 4/2019 | Perl et al. | |
| 2019/0113916 A1 | 4/2019 | Guo et al. | |
| 2019/0156150 A1 | 5/2019 | Krishnan | |
| 2019/0205659 A1 | 7/2019 | Cuban et al. | |
| 2019/0244301 A1 | 8/2019 | Seth et al. | |
| 2019/0263395 A1 | 8/2019 | Hoetzer et al. | |
| 2019/0279247 A1 | 9/2019 | Finken et al. | |
| 2019/0303463 A1* | 10/2019 | Catalano | G06F 16/22 |
| 2019/0324450 A1 | 10/2019 | Lurie et al. | |
| 2019/0354771 A1 | 11/2019 | Kleinrock et al. | |
| 2019/0366926 A1 | 12/2019 | Hathaway et al. | |
| 2019/0370575 A1 | 12/2019 | Nandakumar et al. | |
| 2019/0370760 A1 | 12/2019 | Kundu et al. | |
| 2019/0377336 A1* | 12/2019 | Avery | H04L 67/12 |
| 2020/0005559 A1* | 1/2020 | Grunbok, II | G08G 1/202 |
| 2020/0023811 A1 | 1/2020 | Herman et al. | |
| 2020/0026289 A1* | 1/2020 | Alvarez | G08G 1/04 |
| 2020/0074853 A1* | 3/2020 | Miller | H04W 4/02 |
| 2020/0082721 A1 | 3/2020 | Chen et al. | |
| 2020/0108840 A1* | 4/2020 | Andres | B60W 40/09 |
| 2020/0219336 A1* | 7/2020 | Huffman | G06Q 40/08 |
| 2020/0279119 A1 | 9/2020 | Kuehnle et al. | |
| 2020/0312046 A1* | 10/2020 | Righi | G07C 5/008 |
| 2021/0012125 A1 | 1/2021 | Schmidt et al. | |
| 2021/0039639 A1 | 2/2021 | Song et al. | |
| 2021/0042842 A1* | 2/2021 | Floyd | G06Q 50/26 |
| 2021/0056852 A1* | 2/2021 | Lund | G08G 1/163 |
| 2021/0086778 A1* | 3/2021 | Suthar | G06F 3/017 |
| 2021/0158691 A1* | 5/2021 | Geiselhart | H04W 84/005 |
| 2021/0256846 A1* | 8/2021 | McErlean | G07C 5/02 |
| 2021/0291819 A1 | 9/2021 | Smith et al. | |
| 2021/0291866 A1 | 9/2021 | Smith et al. | |
| 2021/0295459 A1 | 9/2021 | Smith et al. | |
| 2021/0295700 A1* | 9/2021 | Salles | G06F 9/542 |
| 2021/0390605 A1 | 12/2021 | Chow et al. | |

FOREIGN PATENT DOCUMENTS

| | | |
|---|---|---|
| CN | 107042824 A | 8/2017 |
| CN | 206684953 U | 11/2017 |
| CN | 105448135 B | 11/2018 |
| DE | 102007039039 | 12/2017 |
| EP | 2598376 A1 | 6/2013 |
| EP | 3060434 B1 | 11/2019 |
| JP | 11238194 A | 8/1990 |
| JP | H11238194 A | 8/1999 |
| JP | 3848554 B2 | 11/2006 |
| JP | 2007051973 A | 3/2007 |
| JP | 2007076632 A | 3/2007 |
| JP | 2008186416 A | 8/2008 |
| JP | 4235386 B2 | 3/2009 |
| JP | 2011123814 A | 6/2011 |
| JP | 2015230579 A | 12/2015 |
| JP | 2019018766 A | 2/2019 |
| JP | 2019533609 A | 11/2019 |
| KR | 100835385 B1 | 6/2008 |
| KR | 100935737 B1 | 1/2010 |
| KR | 20160112817 A | 9/2016 |
| KR | 20180087530 A | 8/2018 |
| WO | 2009128398 A1 | 10/2009 |
| WO | 2012042776 A1 | 4/2012 |
| WO | 2017190795 A1 | 11/2017 |
| WO | 2018147881 A1 | 8/2018 |

OTHER PUBLICATIONS

Notice of Reasons for Rejection issued in the JP related application No. JP2021-047104, dated Sep. 6, 2022.

Notice of Reasons for Rejection issued in the JP related application No. 2021-04465, dated Sep. 6, 2022.

* cited by examiner

CONSENSUS-BASED TRANSPORT EVENT SEVERITY

TECHNICAL FIELD

This application generally relates to resolving dangerous situations between transports and cargo, and more particularly, to consensus-based transport event severity.

BACKGROUND

Vehicles or transports, such as cars, motorcycles, trucks, planes, trains, etc., generally provide transportation needs to occupants and/or goods in a variety of ways. Functions related to transports may be identified and utilized by various computing devices, such as a smartphone or a computer.

Vehicles and transports may sometimes be involved in various events that may include accidents and transport failures and breakdowns of various types. While a transport may be able to provide significant data with respect to the transport condition, it is often unable to provide useful data as to what led to or caused the event. Traditionally, obtaining such data is performed by accident or other investigators. Therefore, what is needed is a way to determine event causes and involvement without requiring the expense and time of various investigative personnel on-scene.

SUMMARY

One example embodiment provides a method that includes one or more of receiving data, by a transport, from a device in proximity to the transport, determining, by the transport, a dangerous situation based on the data, obtaining consensus, by the transport, to validate the dangerous situation, and notifying the device, by the transport, based on the consensus. The notification includes the dangerous situation, and the data includes one or more of a speed, a direction, and a distance of the device from the transport. The dangerous situation is validated by consensus from one or more other devices proximate to the transport and one or more other transports proximate to the transport.

Another example embodiment provides a transport that includes a processor and a memory, coupled to the processor. The memory includes instructions that when executed by the processor are configured to one or more of receive data, by the transport, from a device in proximity to the transport, determine, by the transport, a dangerous situation based on the data, obtain consensus, by the transport, and notify the device, by the transport, based on the consensus. The notification includes the dangerous situation, and the data includes one or more of a speed, a direction, and a distance of the device from the transport. The dangerous situation is validated by consensus from one or more other devices proximate to the transport and one or more other transports proximate to the transport.

A further example embodiment provides a non-transitory computer readable medium including instructions, that when read by a processor, cause the processor to perform one or more of receiving data, by a transport, from a device in proximity to the transport, determining, by the transport, a dangerous situation based on the data, obtaining consensus, by the transport, to validate the dangerous situation, and notifying the device, by the transport, based on the consensus. The notification includes the dangerous situation, and the data includes one or more of a speed, a direction, and a distance of the device from the transport. The dangerous situation is validated by consensus from one or more other devices proximate to the transport and one or more other transports proximate to the transport.

One example embodiment provides a method that includes one or more of receiving, by a server, primary data related to an event from one or more devices associated with one or more transports, receiving, by the server, secondary data from one or more other devices proximate to the event, analyzing, by the server, the primary data and the secondary data to determine a severity of the event, and sending, from the server, a first notification to the one or more devices associated with the primary data and a second notification to one or more of the other devices associated with the secondary data, based on the severity of the event.

Another example embodiment provides a transport that includes a processor and a memory, coupled to the processor. The memory includes instructions that when executed by the processor are configured to one or more of receive, by a server, primary data related to an event from one or more devices associated with one or more transports, receive, by the server, secondary data from one or more other devices proximate to the event, analyze, by the server, the primary data and the secondary data to determine a severity of the event, and send, from the server, a first notification to the one or more devices associated with the primary data and a second notification to one or more of the other devices associated with the secondary data, based on the severity of the event.

A further example embodiment provides a non-transitory computer readable medium including instructions, that when read by a processor, cause the processor to perform one or more of receiving, by a server, primary data related to an event from one or more devices associated with one or more transports, receiving, by the server, secondary data from one or more other devices proximate to the event, analyzing, by the server, the primary data and the secondary data to determine a severity of the event, and sending, from the server, a first notification to the one or more devices associated with the primary data and a second notification to one or more of the other devices associated with the secondary data, based on the severity of the event.

One example embodiment provides a method that includes one or more of receiving, by a server, first data from a transport experiencing a near accident with a device external to the transport, determining, by the server, that the location of the transport is a dangerous location and the maneuvering of the transport constitutes the near accident based on the first data, and sending a first notification, by the server, to another transport proximate to the dangerous location. The first notification includes information related to the dangerous location and the near accident. The first data includes a location of the transport and information related to a maneuvering of the transport.

Another example embodiment provides a transport that includes a processor and a memory, coupled to the processor. The memory includes instructions that when executed by the processor are configured to one or more of receive, by a server, first data from the transport experiencing a near accident with a device external to the transport, determine, by the server, that the location of the transport is a dangerous location and the transport maneuver constitutes the near accident based on the first data, and send a first notification, by the server, to another transport proximate to the dangerous location. The first notification includes information related to the dangerous location and the near accident, and the first data includes a location of the transport and information related to a transport maneuver.

A further example embodiment provides a non-transitory computer readable medium including instructions, that when read by a processor, cause the processor to perform one or more of receiving, by a server, first data from a transport experiencing a near accident with a device external to the transport, determining, by the server, that the location of the transport is a dangerous location and the maneuvering of the transport constitutes the near accident based on the first data, and sending a first notification, by the server, to another transport proximate to the dangerous location. The first notification includes information related to the dangerous location and the near accident, and the first data includes a location of the transport and information related to a maneuvering of the transport.

One example embodiment provides a method that includes one or more of determining, by a transport, a number of items in the transport, determining, by the transport, a position of each of the items, and in response to a dangerous situation associated with the transport occurring, providing, by the transport, a safety notification associated with at least one of the items.

Another example embodiment provides a transport that includes a processor and a memory, coupled to the processor. The memory includes instructions that when executed by the processor are configured to one or more of determine, by a transport, a number of items in the transport, determine, by the transport, a position of each of the items, and in response to a dangerous situation associated with the transport occurring, provide, by the transport, a safety notification associated with at least one of the items.

A further example embodiment provides a non-transitory computer readable medium including instructions, that when read by a processor, cause the processor to perform one or more of determining, by a transport, a number of items in the transport, determining, by the transport, a position of each of the items, and in response to a dangerous situation associated with the transport occurring, providing, by the transport, a safety notification associated with at least one of the items.

One example embodiment provides a method that includes one or more of determining, by a server, an event associated with a transport, receiving, by the server, atypical data related to the transport from a plurality of devices over various times prior to the event, analyzing, by the server, the atypical data, forming, by the server, a consensus based on the analyzed atypical data to determine a severity of the event, and determining, by the server, an action to take based on the severity.

Another example embodiment provides a transport that includes a processor and a memory, coupled to the processor. The memory includes instructions that when executed by the processor are configured to one or more of determine, by a server, an event associated with a transport, receive, by the server, atypical data related to the transport from a plurality of devices over various times prior to the event, analyze, by the server, the atypical data, form, by the server, a consensus based on the analyzed atypical data to determine a severity of the event, and determine, by the server, an action to take based on the severity.

A further example embodiment provides a non-transitory computer readable medium including instructions, that when read by a processor, cause the processor to perform one or more of determining, by a server, an event associated with a transport, receiving, by the server, atypical data related to the transport from a plurality of devices over various times prior to the event, analyzing, by the server, the atypical data, forming, by the server, a consensus based on the analyzed atypical data to determine a severity of the event, and determining, by the server, an action to take based on the severity.

DETAILED DESCRIPTION

Figure 1A:
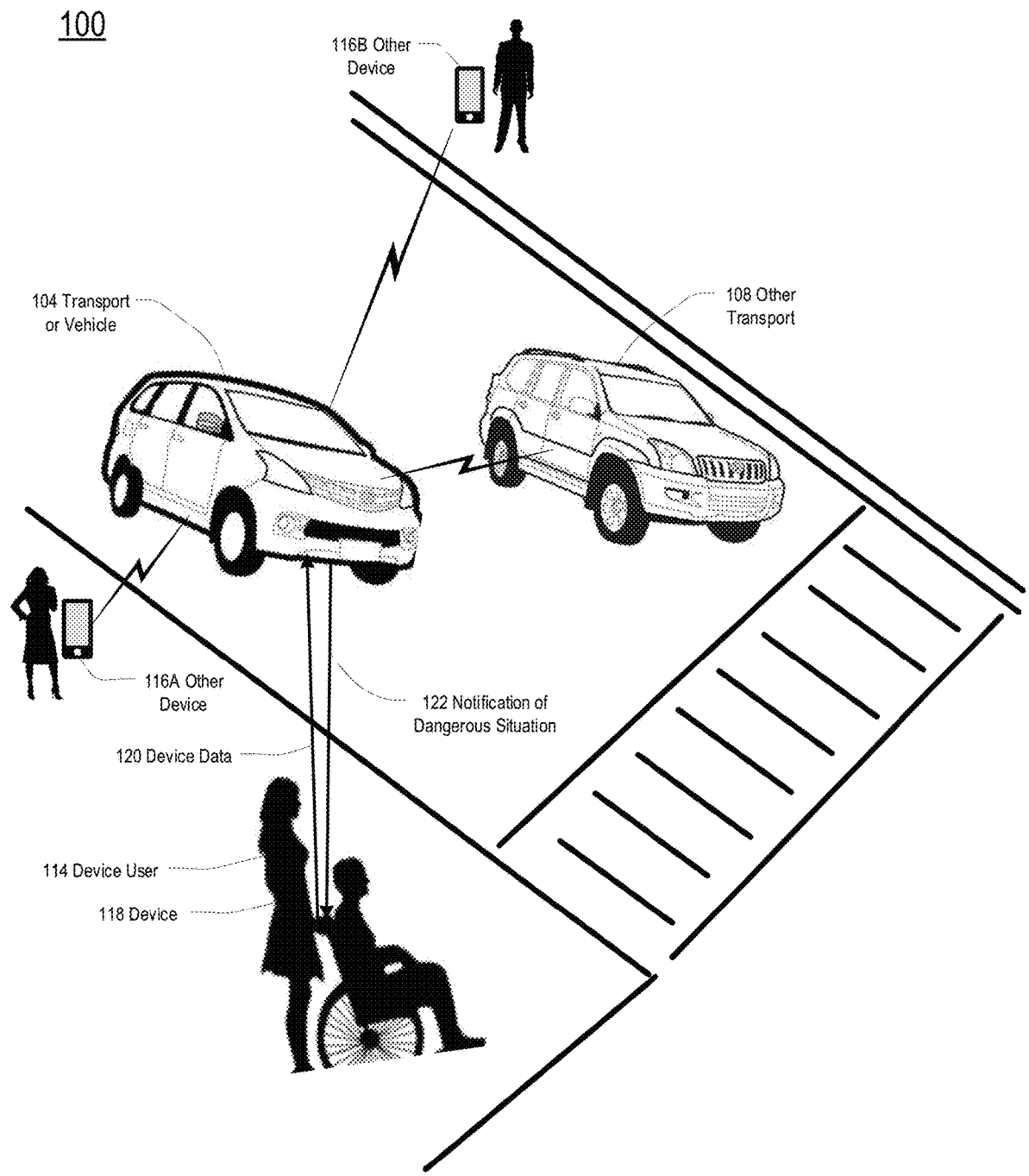
FIG. 1A illustrates an example diagram of transport system for resolving dangerous situations, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout least this specification refers to the fact that a particular feature, structure, or characteristic described in connection with the embodiment may be included in at one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current application, a transport may include one or more of cars, trucks, motorcycles, scooters, bicycles, boats, recreational vehicles, planes, and any object that may be used to transport people and or goods from one location to another.

In addition, while the term "message" may have been used in the description of embodiments, the application may be applied to many types of network data, such as, a packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide at least one of: a transport (also referred to as a vehicle herein) a data collection system, a data monitoring system, a verification system, an authorization system and a vehicle data distribution system. The vehicle status condition data, received in the form of communication update messages, such as wireless data network communications and/or wired communication messages, may be received and processed to identify vehicle/transport status conditions and provide feedback as to the condition changes of a transport. In one example, a user profile may be applied to a particular transport/vehicle to authorize a current vehicle event, service stops at service stations, and to authorize subsequent vehicle rental services.

Within the communication infrastructure, a decentralized database is a distributed storage system, which includes multiple nodes that communicate with each other. A blockchain is an example of a decentralized database, which includes an append-only immutable data structure (i.e. a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permissionless blockchain, anyone can participate without a specific identity. Public blockchains can involve cryptocurrencies and use consensus based on various protocols such as proof of work (PoW). On the other hand, a permissioned blockchain database provides a system, which can secure interactions among a group of entities which share a common goal, but which do not or cannot fully trust one another, such as businesses that exchange funds, goods, information, and the like. The instant application can function in a permissioned and/or a permissionless blockchain setting.

Smart contracts are trusted distributed applications which leverage tamper-proof properties of the shared or distributed ledger (i.e., which may be in the form of a blockchain) database and an underlying agreement between member nodes which is referred to as an endorsement or endorsement policy. In general, blockchain entries are "endorsed" before being committed to the blockchain while entries, which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry, which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain), which is used to store an immutable, sequenced record in blocks. The ledger also includes a state database, which maintains a current state of the blockchain. There is typically one ledger per channel. Each peer node maintains a copy of the ledger for each channel of which they are a member.

A chain is an entry log, which is structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a way for providing a vehicle service to a particular vehicle and/or requesting user associated with a user profile that is applied to the vehicle. For example, a user may be the owner of a vehicle or the operator of a vehicle owned by another party. The vehicle may require service at certain intervals and the service needs may require authorization prior to permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more sensors, which report sensed data to a central controller computer device in the vehicle, which in turn, is forwarded to a management server for review and action.

A sensor may be located on one or more of the interior of the transport, the exterior of the transport, on a fixed object apart from the transport, and on another transport near to the transport. The sensor may also be associated with the transport's speed, the transport's braking, the transport's acceleration, fuel levels, service needs, the gear-shifting of the transport, the transport's steering, and the like. The notion of a sensor may also be a device, such as a mobile device. Also, sensor information may be used to identify whether the vehicle is operating safely and whether the occupant user has engaged in any unexpected vehicle conditions, such as during the vehicle access period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group.

Each interested party (i.e., company, agency, etc.) may want to limit the exposure of private information, and therefore the blockchain and its immutability can limit the exposure and manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a "consensus" approach associated with the blockchain. Such an approach could not be implemented on a traditional centralized database.

Every autonomous driving system is built on a whole suite of software and an array of sensors. Machine learning, lidar projectors, radar, and ultrasonic sensors all work together to create a living map of the world that a self-driving car can navigate. Most companies in the race to full autonomy are relying on the same basic technological foundations of lidar+radar+cameras+ultrasonic, with a few notable exceptions.

In another embodiment, GPS, maps and other cameras and sensors are used in autonomous vehicles without lidar as lidar is often viewed as being expensive and unnecessary. Researchers have determined that stereo cameras are a low-cost alternative to the more expensive lidar functionality.

The instant application includes, in certain embodiments, authorizing a vehicle for service via an automated and quick authentication scheme. For example, driving up to a charging station or fuel pump may be performed by a vehicle operator, and the authorization to receive charge or fuel may be performed without any delays provided the authorization is received by the service station. A vehicle may provide a communication signal that provides an identification of a vehicle that has a currently active profile linked to an account that is authorized to accept a service which can be later rectified by compensation. Additional measures may be used to provide further authentication, such as another identifier may be sent from the user's device wirelessly to the service center to replace or supplement the first authorization effort between the transport and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record.

FIG. 1A illustrates an example diagram of a transport system for resolving dangerous situations 100. A dangerous situation as described herein is a traffic situation involving a moving transport 104 and a device 118 external to the transport or vehicle 104. Transports 104 and other transports 108 may include any type of self-propelled conveyance, including cars, motorcycles, trucks, construction equipment, or even local single passenger transports 104, 108 such as SEGWAYs or similar conveyance. Transports 104, 108 may have a human driver or be driverless transports, and may or may not have any passengers. Transports 104, 108 may include cargo transports including delivery vans, mail delivery transports, and unmanned package delivery drones.

Later model transports 104 may include various computers, communication devices, and sensors. These resources collectively provide navigation functions, hands-free communication, parking assistance, collision detection, and monitoring of nearby other transports 108 in order to provide more information and convenience to passengers and reduce the opportunity for impacts or accidents. These computers, communication devices, and sensors may communicate with other computers, communication devices, and sensors either within or outside of the transport 104 through various technologies such as a transport's Controller Area Network (CAN) bus, BLUETOOTH, WIFI, or the like.

Assume a pedestrian 114 may always have at least one device 118 on them. The device 118 may send information to a transport 104, or a transport 104 may obtain information from the device 118. In some embodiments, a system 100 may also determine a distance between the transport 104 and a device 118 (e.g. mobile phone) and may determine characteristics of the device 118 such as moving in a motion suggesting it is in a person's pocket (i.e. moving left to right which may be universally determined to be a cell phone in a pocket). Another device or processor may be a wearable device, such as a smart watch, glasses, etc., which may have a different movement but can still be determined by movement analysis. One or more signals from these devices 118 may be captured by the transport 104, including speed, direction, distance from the transport 104, etc. Based on this information, the system may create a "visual" of an individual 114 associated with the device 118 and where they are heading in comparison to the transport 104. In one embodiment, a transport 104 may take evasive action prior to an accident.

Consensus may mean taking more than one reading from multiple processors associated with an individual 114 associated with a device 118. For example, a dog's collar may include a processor, and a processor may also be present on the individual 114. Both devices may provide information to a transport 104. For example, a transport 1 (T1) 104 may receive data from a processor associated with a person or device user 114. A transport 2 (T2) 104 may detect the same thing. A transport 3 (T3) 104 may also detect the same thing. All three transports 104 may be in proximity to the same individual 114. T1, T2, and T3 may also be approaching from different directions. For example, T3 104 may be stopped at a stop sign and T2 104 and T1 104 may be approaching from different directions. All data 120 may be sent to a server 112 (not shown), where consensus is derived that the individual 114 is moving at that location, at a given speed and direction. Information may also be sent to transports 104 that may coincide with the individual 114 at some point when a potentially dangerous situation may arise.

As another example, most cities have "walk" signs at crosswalks. Sometimes, a countdown is shown where a number of seconds are presented when the pedestrian 114 should clear the road. A transport 104 in a furthermost lane from where the pedestrian 114 may be in a position where there may arise a dangerous situation. The light turns green, and the pedestrian 114 may still be in the road. The system 100 may determine, based on transports 104, 108 that are at the crosswalk, that the pedestrian 114 is not going to make it across the road in the time when the light turns green for the transports 104, 108. Based on the speed that the pedestrian 114 is walking (such as the data received by the at least one transport 104), a consensus may be made from other transports 108 stopped at the crosswalk to validate the determination. For example, the system 100 may send a warning to a furthermost transport 108, where the warning contains: "When light turns green, don't proceed. A pedestrian may be in the crosswalk".

In an alternate embodiment, the system 100 may notify transports 104, 108 that may at another time be involved in the dangerous situation, based on the received data. For example, if a person is riding a bicycle down a roadway, the system may send a notification to other transports 108 behind the nearest transport 104, in addition to the nearest transport 104, as those transports 108 may arrive at a dangerous situation. In yet another embodiment, when a person on a scooter is going 20 mph and cars are going 20 mph, no notifications may be sent, since the scooter is going at or around a speed of the transports 104, 108.

A device 118 may be associated with a device user 114, who is an individual in proximity to the transport 104. The individual 114 may be a pedestrian in proximity to the transport 104, such as a pedestrian in or approaching a crosswalk or a roadway, or a device user 114 operating a form of conveyance such as a scooter, a skateboard, roller skates, or other forms of conveyance.

A transport 104 may receive data 120 from the device 118 that is in proximity to the transport 104. The device data 120 may include one or more of a speed, a direction, and a distance of the device 118 from the transport 104. Next, the transport 104 determines a dangerous situation exists, based on analyzing the device data 120. For example, the transport 104 may determine a dangerous situation exists because the device data 120 indicates insufficient reaction time exists for a transport 104, 108 to avoid a pedestrian 114 in a crosswalk, due to limited visibility or night conditions. The transport 104 determines a consensus in order to validate the dangerous situation. The consensus may be determined from one or more other devices 116 proximate to the transport 104, and/or one or more other transports 108 proximate to the transport 104. FIG. 1A illustrates two other devices 116, shown as other device 116A and other device 116B. After obtaining the consensus, the transport 104 notifies 122 the device 118, where the notification 122 includes the dangerous situation. The dangerous situation may include any situation that places the device 118 and/or device user 114 in peril relative to the transport 104 or another transport 108. For example, a dangerous situation may include a crosswalk, a road shoulder, a baby stroller, a wheelchair, or any type of situation that reduces a safety margin relative to the transport 104, device 118, and device user 114.

In one embodiment, the transport 104 may transmit the data 120 to a server 112 (not shown), which may determine the dangerous situation, obtain the consensus from one or more other devices 116 and/or one or more other transports 108, and provide a notification of the dangerous situation 122 to the transport 104 itself of the user device 118. Determining the dangerous situation may be based on a speed and a direction of the transport 104 and a speed and direction of the device 118.

In another embodiment, a change in movement pattern of the device 118 may be detected by analyzing the device data 120. The movement pattern change may reflect a change from a pedestrian speed and direction (e.g. 2 miles per hour along a walking path parallel to a roadway) to a transport occupant speed and direction (e.g. 35 miles per hour in an opposite direction on the roadway). This detected change in movement pattern may trigger checking to see if an amber alert should be generated. For example, a local or county police department could be checked for a potential amber alert if a change in movement pattern were detected. If a recently missing person were identified, the location associated with the change in movement pattern could be supplied to local or county police or the amber alert service, and various cameras or other devices in proximity to the location could be reviewed to provide an individual or transport 104 identity. In one embodiment, a notification 122 may be provided to one or more other devices 116 in proximity to the user device 118 to initiate audio and/or video recording.

In one embodiment, a transport 104 or other transport 108 may be provided with an action to take in order to reduce the chance of the transport 104 impacting a user 114 associated with the user device 118, or those close to the user device 118. In another embodiment, the device 118 may receive the notification 122 and in response initiate audio and/or video recording.

Figure 1B:
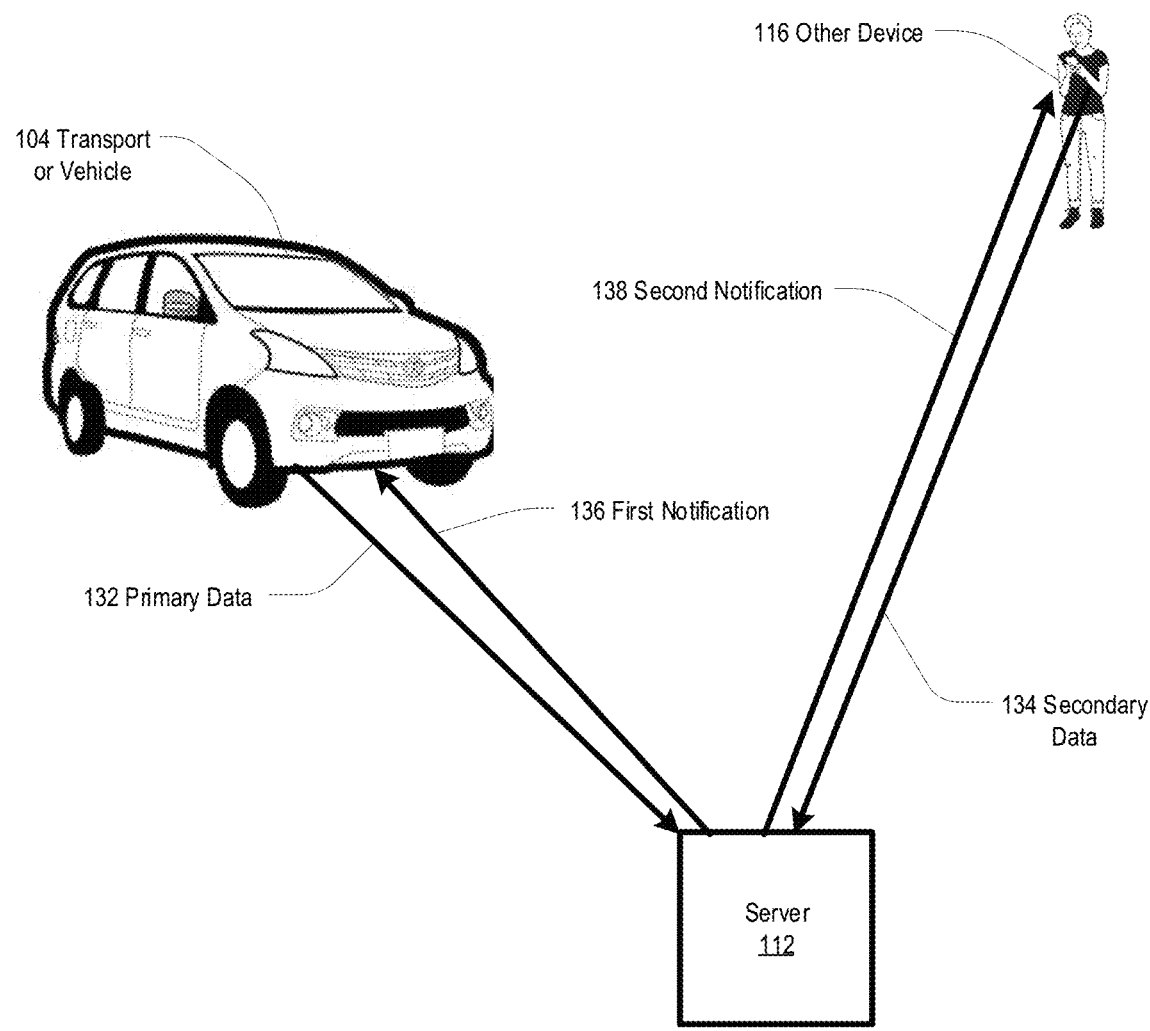
FIG. 1B illustrates an example diagram of a transport system for processing primary and secondary data, according to example embodiments.

FIG. 1B illustrates an example diagram of a transport system for processing primary and secondary data 130. Primary data 132 is from devices related to an event. Secondary data 134 is from devices from transports and/or people in proximity to the event. In one embodiment, a server 112 receives primary data 132 related to an event from one or more devices associated with one or more transports 104. The event may include a collision, a near-collision, or a serious traffic infraction. The one or more devices may be individual devices associated with individual occupants of the one or more transports 104. In other embodiments, the one or more devices associated with the one or more transports 104 may be embedded within, and as part of, the one or more transports 104. The server 112 also receives secondary data 134 from one or more other devices 116 proximate to the event. For example, there may be other individuals not in the transport 104 but close by in the area. One or more of the individuals may have a device 116 that provides secondary data 134 to the server 112.

In one embodiment, an event may occur such as a transport 104 being impacted by another transport 108. The transport 104 and a device associated with the other transport 108 may send data (i.e. primary data 132) associated with the event to a server 112. Other transports 108 and/or devices 116 may also send data (i.e. secondary data 134) associated with the event to the server 112. The server 112 analyzes the data and sends the data associated with the event to other transports 108 and/or devices 116 in proximity to the event. When the event is determined to be alleviated, the server 112 may send a first notification 136 to the entities associated with the primary data 132 and a second notification 138 to the entities associated with the secondary data 134.

An example of the instant solution includes receiving, by a server 112 (which may be in a network 152, and/or on a transport 104, 108, etc.), primary data 132 (which may be video/image/text/statistical data from sensors on a transport 104, 108) from at least one device 116 (which may a device in, on, or associated with a transport 104, a device 116 on a bicyclist/jogger/pedestrian and/or a building, light pole and the like) related to an event (which may a near collision, a collision, a traffic infraction, etc., between: a single transport 104 and an object, two or more transports 104, 108, a person and a transport 104, etc), receiving, by the server 112 secondary data 134 (which may be video/image/text/statistical data of the event from another angle/distance/time) from other devices 116 proximate to the event (which may be devices 116 associated with pedestrians near the event, and/or devices in, on, or associated with transports 108 near the event), analyzing, by the server 112, the primary data 132 and the secondary data 134 to determine the severity of the event (which may reflect an amount of damage, injury, road condition, etc.), and sending, from the server 112, a first notification 136 (which may include instructions on next steps, safety considerations based on the severity, etc.) to the at least one device associated with the primary data 132, and a second notification 138 (which may include a request for additional information related to the event, directions to maneuver around the event, etc.) to at least one of the other devices 116 associated with the secondary data 134 based on the severity of the event.

The server 112 may analyze the received primary 132 and secondary 134 data in order to determine a severity of the event. Typically, primary data 132 may be produced by occupant devices and reflects an internal state of the transport 104, while secondary data 134 is produced by pedestrian or outside devices 116 and reflects an external state of the transport 104. The internal state of the transport 104 may be more useful for determining any injuries to occupants, while the external state of the transport 104 may be more useful for determining damage to the transport 104 itself or any property damage sustained. After determining the severity of the event, the server 112 may send a first notification 136 to the one or more devices associated with the primary data 132 and a second notification 138 to one or more of the other devices 116 associated with the secondary data 134. One or both of the primary 132 and secondary 134 data may include one or more of audio, video, images. text, and statistical data. The secondary data 134 may reflect a different direction, perspective, or distance than the primary data 132.

In one embodiment, the server 112 may transmit a final notification to the one or more devices and other devices when the event is alleviated. This final notification may be intended to let a user associated with the devices or other devices that the event or event severity are no longer of concern. In one embodiment, in response to the server 112 determines a severity for the event, one or more types of first responders associated with the severity may be selected. A third notification may be provided to selected first responders in order to respond to the event. For example, the severity of the event may indicate the presence of fire, and the third notification may request firemen as first responders.

In one embodiment, a line of sight may be determined to not exist between the one or more other devices 116 providing the secondary data 134 and the one or more devices associated with the one or more transports. In one embodiment, each other device 116 may capture a panoramic image of the area in proximity to the other device 116. Panoramic images may be analyzed to determine if the panoramic images include the transport 104; if the panoramic images do not include the transport 104, then a line of sight does not exist between the one or more other devices 116 providing the secondary data 134 and the one or more devices associated with the one or more transports. In some cases, this may result in the secondary data 134 from the one or more devices 116 not being included in the severity of event analysis. One reason this may not occur may be related to security: not including secondary data 134 that has not been vetted or at least have the credibility of being related in some way to the primary data 132. Another reason this may not occur may be related to one or multiple events. For example, a lack of line of sight may indicate a first event from the primary data 132 and a different, unrelated second event from the secondary data 134. Ideally, each of these two or more events could require a separate and independent analysis/evaluation, rather than including the secondary data 134 in the event severity analysis for the primary data 132. In that case, the secondary data 134 may be only used for analysis of a second event and determining a second event severity.

In one embodiment, the server 112 may analyze timestamps associated with the primary data 132 and secondary data 134 in order to determine a severity of the event. Each of the primary 132 and secondary 134 data may include timestamps that reflect a time when the primary data 132 or the secondary data 134 was created. The server 112 may review the difference between timestamps for the primary 132 and secondary 134 data to check if the difference is within a predetermined range. For example, if timestamps fall within the predetermined range, it may indicate timestamps associated with the same event. If timestamps do not fall within the predetermined range, it may indicate timestamps associated with different events.

Figure 1C:
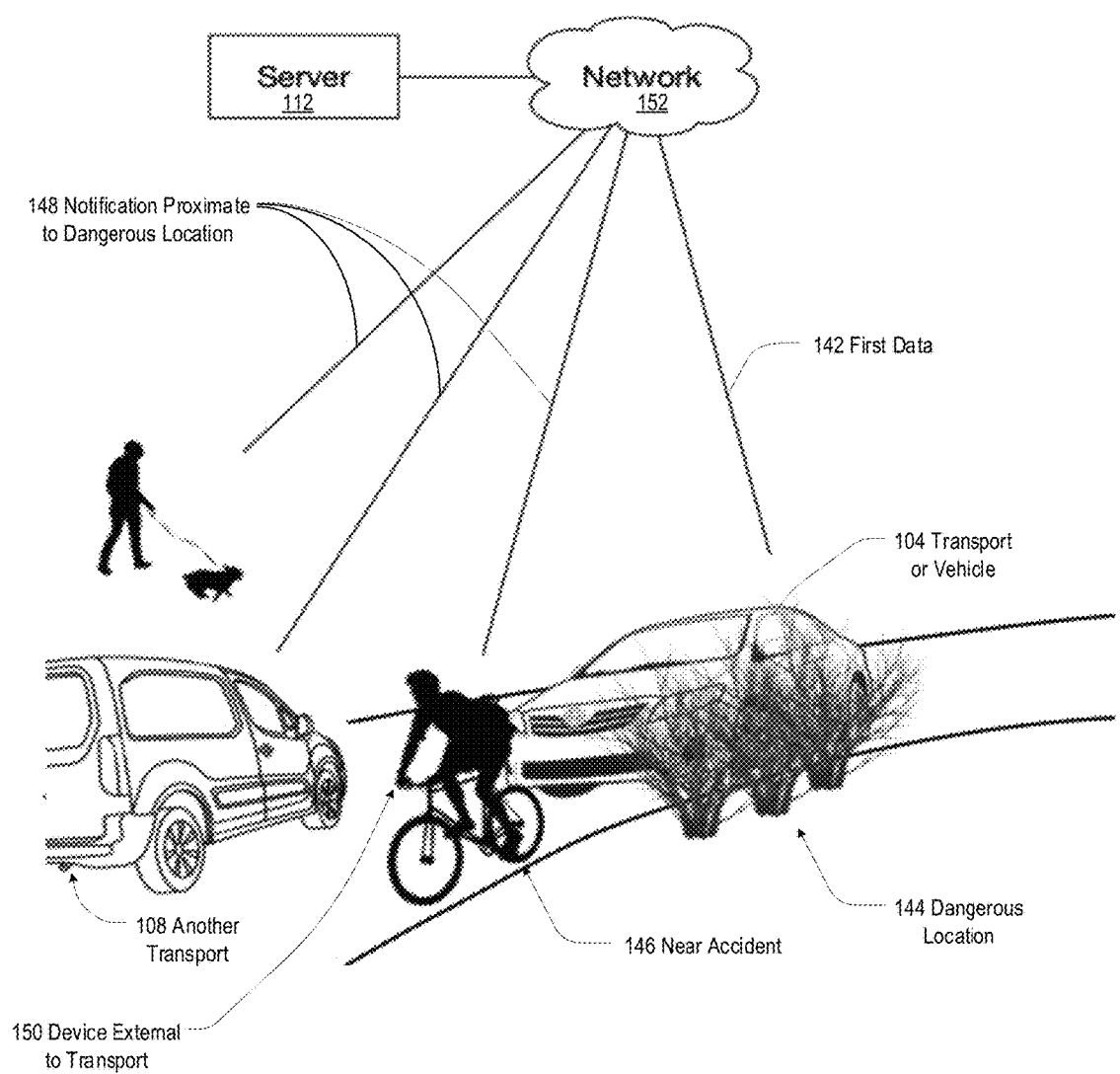
FIG. 1C illustrates an example diagram of a transport system for resolving and improving near accident conditions, according to example embodiments.

FIG. 1C illustrates an example diagram of a transport system for resolving and improving near accident conditions 140. A transport system 140 may include a server 112 coupled to a network 152, a transport or vehicle 104, another transport 108, and one or more devices external to the transport 150. A near-accident 146 is an event that comes close to an accident without there being an actual impact between two or more transports 104, devices 150, individuals, or property.

Accidents that occur between transports 104 and pedestrians are normally recorded, such as in police reports—especially when an in injury occurs as a result of an accident. Near-accidents 146 are not normally recorded, as there is no current method to record a near-accident 146. When a transport 104 almost hits a pedestrian, bicyclist, a person on a scooter, a jogger, or the like, both the transport 104 and/or the person external to the transport 104 may not even interact with each other. What is needed is a method to record the near-accident 146 to a server 112 or database, and an ability to perform statistics of near-accidents 146 to be able to determine dangerous locations 144. These determinations may be useful to entities responsible for making roads safe, such as the cutting of trees and bushes near a road, adding additional road signs to warn people and transports 104 of a potentially dangerous location 144, improving the line of sight, improve lighting, and the like. When a safer environment is unable to be created, transports 104 and/or devices associated with people outside of transports 150 learn to maneuver in a different manner that is deemed to be safer, such as through notifications received by the system 140 when they are at or near a dangerous location 144. Additionally, data 142 may be useful for urban planning, event planning, and provide the ability to access a situation and/or memorialize a situation such as a near-accident 146.

In one embodiment, a near-accident 146 may be defined by a maximum range apart that the two objects pass within each other without touching, for example, six feet. For example, a near-accident 146 may be registered if a sensor on a transport 104 measures a range to another object using radar, lidar, or other sensing technology. In another embodiment, a near-accident 146 may be defined by a maximum time apart that two occupy a same space or location. For example, a second transport 108 in the same space as a first transport 104 and less than two seconds later may be defined as a near-accident 146. The time delta defining a near accident 146 may also be dependent on a speed and/or acceleration of one or more transports 104, or a relative speed between one or more objects. A server 112 may be tracking position, location, speed, direction, and acceleration between all types of objects, and continually updating near-accident 146 data with such occurrences as they occur. In this way, a dynamic database of near-accident 146 occurrences may be continually updated. Objects having frequent occurrences of near-accidents 146 may be identified and logged, with other objects notified in advance of increasing proximity to such objects. In some embodiments, objects having frequent occurrences of near-accidents 146 may be moving objects such as transports 104 or other transports 108, or conveyance associated with devices 150. In other embodiment, objects having frequent occurrences of near-accidents 146 may be static and unmoving objects such as dangerous locations 144 or a terrain feature such as a tree, a bridge, or a concrete abutment.

Referring to FIG. 1C, a transport 104 is depicted on a roadway where there may be obstacles near the road, for example. The obstacles shown in FIG. 1C are bushes near the roadway. A bicyclist is in front of the transport 104. The bicyclist has in possession a device 150, such as a mobile device. The transport 104 and the device 150 may be communicably coupled to a network 152, such as the Internet. Also communicably coupled to the network 152 is a server 112. Additional elements may be present that are part of the system 140: an external device, such as a man walking a dog, or another transport 108 on the roadway traveling in the opposite direction of the transport 104, for example. The man and/or the dog may have another device 150 that is connected to the network 152, and the transport 108 may also have a connection to the network 152.

As the transport 104 comes near the bicyclist in a near-accident 146 scenario, first data 142 is sent from the transport 104 and the bicyclist device 150 to the server 112 via the network 152. The data 142 may be sent from a computer in the transport 104, such as a transport computer. Data 142 may also be sent from the device 150 to the server 112 via the network 152. In one embodiment, first data 142 may be sent when a maneuver is detected by sensors on the transport 104, such as a sharp turn, sharp braking, or the like. Additionally, first data 142 may be sent by a device 150 associated with the bicyclist, such as a mobile device 150, when a maneuver is detected by sensors on the device 150, such as sharp turning, sharp braking, or the like. In another embodiment, first data 142 may be sent from the transport 104 and the device 150 when an abrupt maneuver of one or more of the transport 104 and the device 150 is paired with the two computers at a close range, such as a range below a determined threshold. The first data 142 sent to the server 112 may include details of the near-accident 146 and may include but not be limited to the location of the computer, the time of the near-accident 146, the speed at the time of the near-accident 146, a direction of the computer at the time of the near-accident 146, and a rate of deceleration of the computer at the time of the near-accident 146. The server 112 may be able to ascertain from stored data the number of near-accidents 146 at the location of the current near-accident 146 to determine whether the location is considered a dangerous location 144, based on the number of historical near-accidents 146 at that location. This data may be stored in the server 112, such as in a database (not shown). When a location is determined to be a dangerous location 144, the system may take further action. A notification 148 may be sent by the server 112 to one or more external devices proximate to the location 150, such as the man walking the dog and another transport 108, for example. The notification 148 may include information about the dangerous location 144. This may allow other device in proximity 150 to become aware of the dangerous location 144 and possibly avoid an unlikely event. The computers may receive the notification 148 and may perform an alert in procedures normally utilized for incoming notifications. Other devices 150 and transports 108 whose speed and direction may indicate that they will be in proximity to the dangerous location 144 according to the system 140, may also be notified of the dangerous location 144.

In one embodiment, external devices 150, such as the other transport 108, the device 150, the transport 104, and the server 112, may be in communication with one another, such as via the network 152. In another embodiment, the server 112 and one or more elements in a telecom network may be in communication with one another wherein the at least one external device 150, or additional external devices 150 (not shown) may be part of the telecom network 152. The transport 104 may send information to the server 112, wherein a telecom network 152 such as Verizon is communicated with, such as a query with data indicating a request for the transport's 104 location at a given time. The Verizon network may respond to the query with the data. In another embodiment, when the server 112 may receive information from the transport 104 regarding the near-accident 146, the server 112 may send a query to a network 152, such as the Verizon network, requesting which devices were closest to the transport 104 at the location at the time of the near-accident 146. A response from the Verizon network (for example) may allow the server 112 then to know the devices external to the transport 150 where interaction may occur, such as notifications 148 to the devices 150. In another embodiment, a server 112 may perform analysis according to received data. For example, the server 112 may be able to ascertain the type of transport 104 associated with the external device 150. According to the speed and location of the external device 150, the server 112 may be able to determine if the device 150 is associated with a person walking, a person on a scooter, a person on a bike, a person jogging, etc. Therefore, the server 112 is able to determine that there was a scooter at the location due to the location and the speed of the device 150. The server 112 is then able to determine that scooters may be banned from that location when there are a number of near-accidents 146 of scooters at that location.

In another embodiment, data 142 received at the server 112 from the external device 150 may include the location of the device 178, where the location is one or more a location of the transport 104 and a location of the device 144. In another embodiment, the server 112 may send a notification 148 to another computer connected to the network 152 (not shown) containing information about the dangerous location 144. This may be used to correct elements causing the dangerous location 144. For example, an entity responsible for road maintenance, the entity responsible for trimming bushes and/or trees near a road, and the like.

In another embodiment, the notification 148 sent to the devices external to the transport 150 may include steps to avoid the dangerous location 144. In another embodiment, both the transport 104 and the device 150 associated with the near-accident 146 may have an application downloaded on and executing on the respective computer, the application may immediately provides information about the dangerous location 144. If either the device 150 or transport 104 do not have the downloaded application, the server 112 may become involved.

The server 112 receives first data 142 from a transport 104 that experiences a near-accident 146 with a device external to the transport 150. The device external to the transport 150 may be associated with a pedestrian or individual in close proximity to a dangerous location 144, and may be a smart phone, smart watch, wearable computer, or other form of communication device associated with the pedestrian or individual. The first data 142 may include a location of the transport 104 and information related to maneuvering of the transport 104. The maneuvering of the transport 104 constitutes the near-accident 146 based on the first data 142. Next, the server 112 determines that the location of the transport 104 is a dangerous location 144 from the first data 142. Finally, the server 112 sends a first notification 148 to another transport 108 proximate to the dangerous location 144. The first notification 148 includes information related to the dangerous location 144 and the near-accident 146. The information related to the dangerous location 144 may include a recommended item to reduce future near-accidents at the dangerous location 144.

The first data 142 may include a location of the transport 104 and one or more of a time at the location of the device 150, a time at the location of the transport 104, a speed of the device 150, a speed of the transport 104, a direction of the device 150, a direction of the transport 104, a deceleration rate of the device 150, a deceleration rate of the transport 104, more than a threshold number of first data 142 instances at the location of the transport 104 previously received by the server 112, a swerving rate of the transport 104, a honking of a horn of the transport 104, a flashing of headlights of the transport 104, an engagement of taillights of the transport 104, etc.

In one embodiment, the server 112 may determine any other devices 150 in proximity to the transport 104 when the near-accident 146 occurred, obtain second data (not shown) from the other devices 150, and modify the notification 148 based on the second data. In another embodiment, the server 112 may send a second notification (not shown) to one or more entity devices, where the one or more entity devices may be responsible for alleviating the dangerous condition.

In one embodiment, the transport 104 experiencing the near-accident 146 and the device external to the transport 150 may each include an application configured to autonomously communicate the first data 142 to the other of the transport 104 and device 150. In another embodiment, the server 112 may analyze the first data 142 and determine a high near-accident 146 rate associated with a type of conveyance associated with the device 150 (a bicycle, for example). The server 112 may then include a restriction on operation of the type of conveyance in the first notification 148 (e.g., bicycles may only be operated during daylight hours in proximity to the dangerous location 144).

In another embodiment, the server 112 may receive less than a threshold number of first data 142 instances at the location of the transport 104 previously received by the server 112. The threshold number may indicate a minimum number of reported first data 142 instances required to analyze to determine a location may be a dangerous location 144. In the event a threshold number of first data 142 instances has not been received, the server 112 may not send the first notification 148 and instead increment the number of first data 142 instances. This will move the number of first data 142 instances closer to the threshold number so that a next first data 142 instance may possibly trigger the threshold and first notification 148.

Figure 1D:
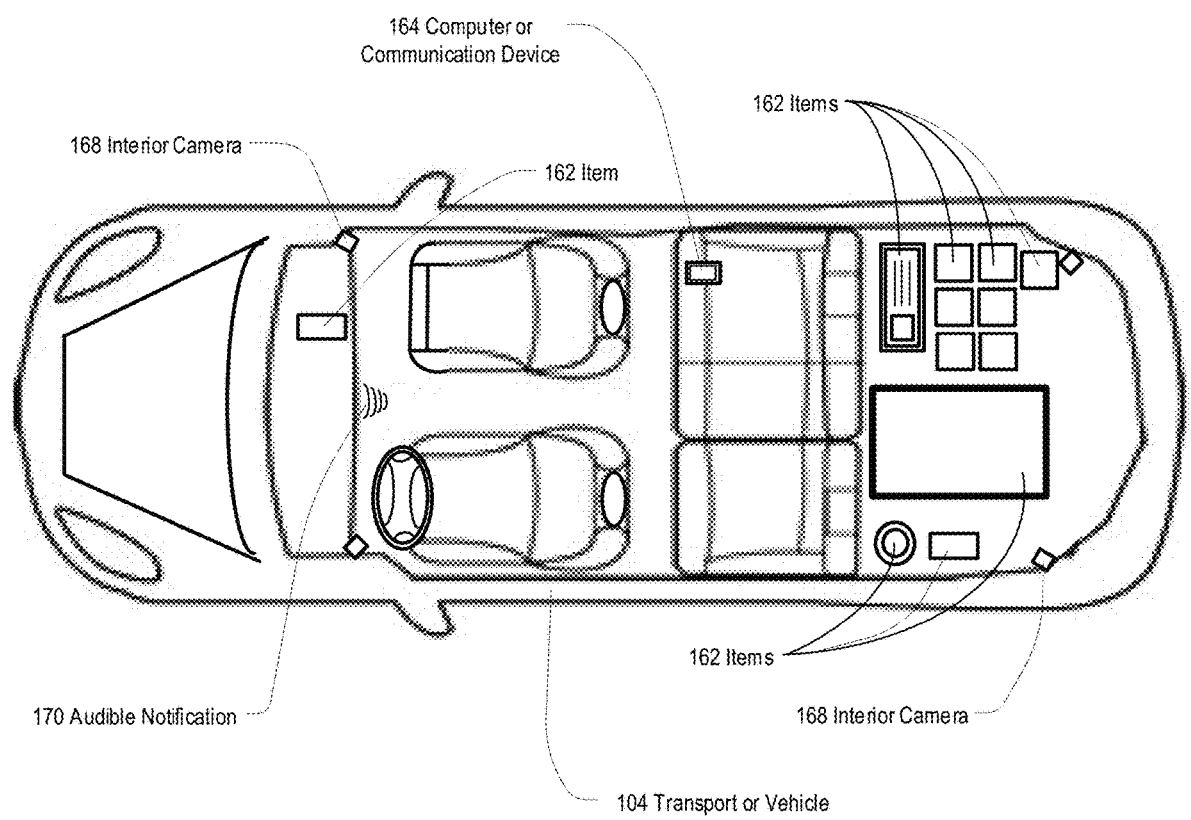
FIG. 1D illustrates an example diagram of a transport system for resolving item dispositions in response to a dangerous situation, according to example embodiments.

FIG. 1D illustrates an example diagram of a transport system for resolving item dispositions in response to a dangerous situation 160, according to example embodiments. Referring to FIG. 1D, a plan view 160 of an exemplary transport or vehicle 104 is shown. Transports or vehicles 104 may generally be classified as passenger transports or cargo transports. Passenger transports are primarily intended to transport passengers, while cargo transports are primarily intended to transport cargo.

Any type of transport or vehicle 104 that may carry one or more items 162 applies to FIG. 1D. Items 162 are any physical objects that are not part of the transport or vehicle 104 and are not physically attached to an interior of the transport or vehicle 104. Items 162 may include any cargo, bags, purses, tools, pets, and/or computing or communication devices 164. Computing and communication devices 164 are generally associated with specific occupants of the transport or vehicle 104. In some embodiments, occupants may be considered items 162 if not securely belted into the transport or vehicle 104.

Transport or vehicle 104 may include any number of passenger seats. Even though passenger transports 104 are primarily intended to carry passengers, all such transports 104 may carry many items 162, depending on size. Some transports 104 include a trunk area to carry items 162 separate from the passenger cabin, and the present application is not intended to address items stored in a trunk, glove compartment, console, or other such enclosed areas separate from a passenger compartment. Those enclosed areas typically protect transport 104 occupants from unsecured items 162 moving in an uncontrolled manner.

Item 162 management is important to efficient and safe operation of transports 104. Heavy and/or poorly distributed items 162 may place an uneven load on a transport 104. For example, an excess of weight may be on the right side vs. left side or the back vs the front. This may negatively impact gas mileage, brake wear, tire wear, or transport 104 performance. Transport 104 performance may include handling, cornering, acceleration, or braking—and in extreme unbalanced situations may make it easier for the transport 104 to roll over or lose control in an accident or during evasive maneuvers. Unsecured items 162 may become projectiles during transport 104 movement, and potentially injure or distract the driver or other occupants—either of which may cause a transport 104 accident.

Any number of items 162 may be carried within a passenger compartment of a transport 104. FIG. 1D shows many items 162 placed into a rear cargo compartment of a transport 104 such as an SUV or minivan. One computer or communication device 164 (also an item 162) has been placed on a $2^{nd}$ row passenger seat, and another item 162 has been placed on the dashboard in front of the $1^{st}$ row seats. The transport or vehicle 104 may include one or more interior cameras 168 or other sensors, and may provide audible notifications 170 to the driver or other occupants of the transport 104. The transport 104 may also send visual and/or audible notifications to occupant computing or communication devices 164, or present visual notifications through a display of the transport 104 (not shown). The other sensors may include any number of pressure or other sensors that can detect items 162 in various specific locations within the transport 104. Such sensors may, for example, detect pressure in many discrete areas within the transport 104 and determine whether or not items 162 have been loaded in a balanced fashion.

In one embodiment, a transport or vehicle 104 may experience a dangerous situation. Dangerous situations may include any transport 104 failure, an unsecured item 162, an unsafe item 162 position, an unsafe item 162, or historical data associated with a dangerous location in proximity to the transport. Transport 104 failures may include any type of mechanical, electrical, hydraulic, software, or visibility-related failures. Unsecured items 162 are any items 162 that may potentially become uncontrolled projectiles within the transport 104 cabin. An unsafe item 162 position includes any location within a transport 104 that is not intended for the item 162 to be—such as on a lap or on a dashboard. An unsafe item 162 is an item that may be unsafe to transport, including but not limited to flammable liquids, cutlery, loaded and unsecured firearms, pointed objects, radioactive objects, and breakable objects.

The transport 104 determines a number of items 162 in the transport 104. In one embodiment, one or more cameras 168 within the transport 104 obtain camera images of the interior of the transport 104. Each such camera 168 may have a different location and viewing perspective from all other cameras 168 within the transport 104. Each of the obtained camera 168 images is then compared to stored images of the transport 104. The stored images reflect the appearance of the transport 104 when it is empty. A computer or processor within the transport 104 may perform the comparison, using stored images in a memory device accessible to the computer or processor. The computer or processor may perform edge detection, item 162 surface reflection or brightness, or utilize other optical techniques to identify each separate item 162.

The computer or processor determines differences between the camera images and the stored images, and may establish the number of differences as the number of items 162. Images from a given camera 168 may be cross-referenced with images from other cameras 168 to correlate each item 162 and ensure that a same item 162 is not counted multiple times. Alternately or in combination with optical comparison using cameras 168, the transport 104 may utilize one or more pressure or other types of sensors to identify and discriminate items 162 to arrive at an item 162 number.

The transport 104 may also determine a position of each item 162 in the transport 104. In one embodiment, the one or more cameras 168 may obtain camera images of the interior of the transport 104. Each such camera 168 may have a different location and viewing perspective from all other cameras 168 within the transport 104. The computer or processor may identify one or more items 162 from the camera images, and map each of the one or more items 162 to location data of the transport interior. For example, the transport memory may include location data for each discrete position within an empty transport 104, to a level of granularity. By mapping each item 162 to the stored location data, a position of each item 162 may be determined.

In one embodiment, the transport 104 may determine a dangerous situation and responsively provide a safety notification 170 associated with one or more items 162 (after number and position of the items 162 has been determined. In one embodiment, the dangerous situation may include another transport operating in an unsafe manner in proximity to the transport 104. An unsafe manner may include swerving repeatedly, entering a roadway lane of the transport 104, or other similar behavior. In response to the dangerous situation, the transport 104 may provide a safety notification 170. The safety notification 170 may include one or more of a request for occupants of the transport to put down handheld devices, pay attention to surroundings of the transport, and a description of the dangerous situation. The safety notification 180 may include an audible notification, a visual notification, a vibration notification, or any combination or other type of notification.

In one embodiment, the transport 104 may determine the dangerous situation within a time period, and take one of several actions. In one embodiment, it may inhibit the transport 104 from starting until the dangerous situation is resolved, if the computer or processor determines the transport 104 is not started. It may inactivate the transport 104 if the computer or processor determines the transport 104 is started and parked. Finally, it may provide a second safety notification if the computer or processor determines the transport 104 is started and not parked.

In one embodiment, one or more sensors within the transport 104 may obtain a current position and weight of each item 162 in the transport 104, determine a weight distribution of the items 162, and provide instructions to move one or more items 162 to achieve a balanced weight distribution for the items in the transport 104. This may utilize one or more pressure sensors, as previously discussed.

Figure 1E:
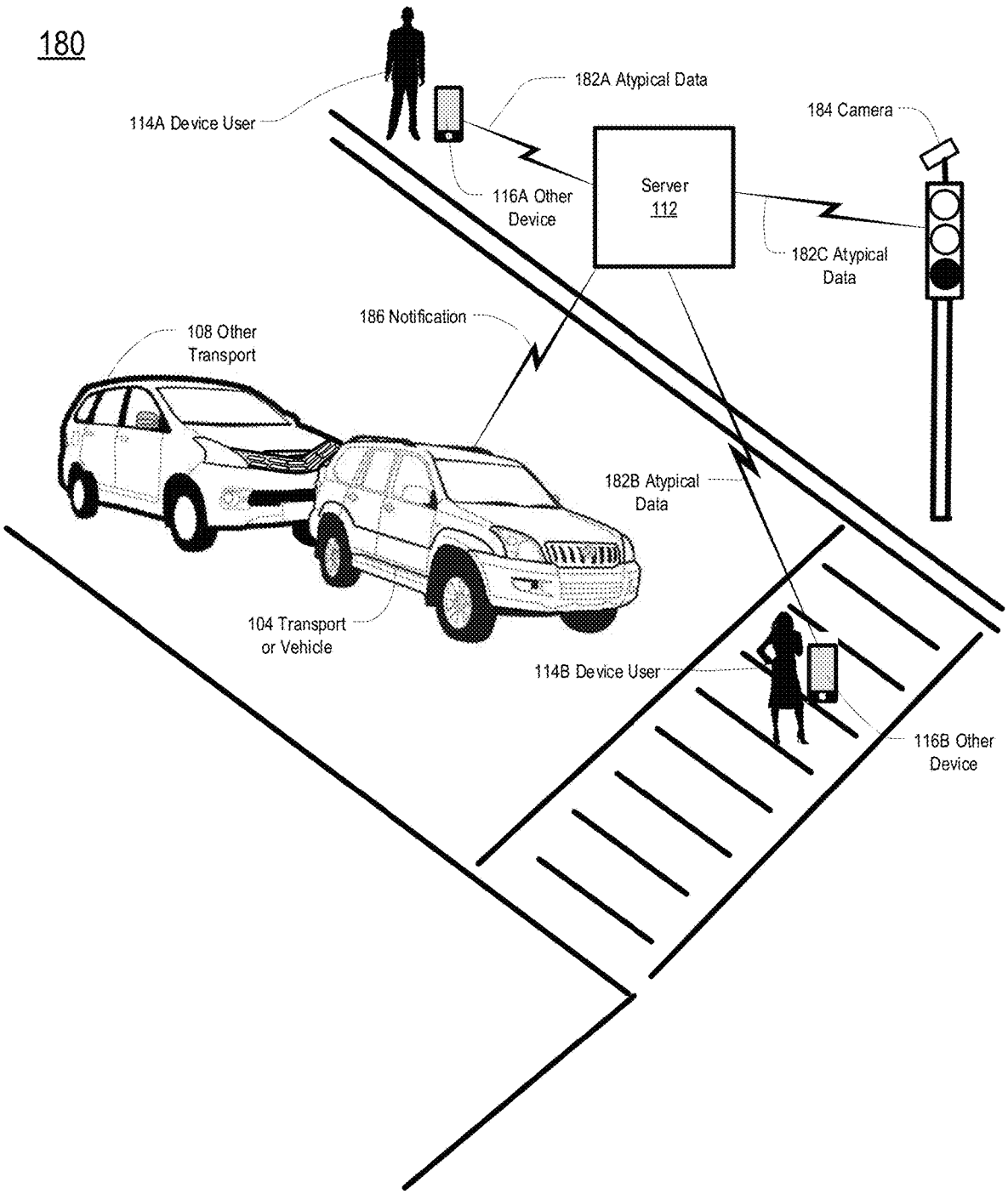
FIG. 1E illustrates an example diagram of a transport system for taking actions based on received atypical data, according to example embodiments.

FIG. 1E illustrates an example diagram of a transport system for taking actions based on received atypical data 180, according to example embodiments. Referring to FIG. 1E, a system 180 for receiving and processing atypical data associated with an exemplary transport or vehicle 104 is shown.

The system 180 may include one or more transports or vehicles 104 and one or more other transports 108. A transport 104 may be communicatively coupled to a server 112, and receive notifications 186 as described herein. One or more device users 114 with corresponding other devices 116 may be present. FIG. 1E illustrates two device users, identified as device users 114A and 114B. Device user 114A is associated with other device 116A, and device user 114B is associated with other device 116B. In addition to device users 114, other devices may be present as well, including a device associated with one or more other transports 108 and a fixed camera 184. The devices 116, 184 and devices associated with other transports 108 may be either stationary or in motion.

The transport or vehicle 104 may experience an event, which may include an accident or collision with the other transport 108 or property, or the transport 104 being struck by an object. The event may also include a failure of the transport 104, including but not limited to a loss of automotive fluids and catching fire. The server 112 may determine the event associated with the transport 104.

Prior to the event, the server 112 may receive atypical data 182 related to the transport 104 from a plurality of devices 116, 184 over various times prior to the event. FIG. 1E illustrates atypical data 182A provided by other device 116A, atypical data 182B provided by other device 116B, and atypical data 182C provided by camera 184. The atypical data 182 may include any of audio, video, photos, SMS messages, emails, or sensor data that communicates anomalous behavior in proximity to the transport 104. In one embodiment, the atypical data 182 may include sensor data relating to anomalous behavior of the transport 104 from the plurality of devices 108, 116, 184. For example, other device 116A may communicate one or more photos showing transport 104 leaking automotive fluids prior to an engine of transport 104 catching fire as atypical data 182A. For another example, a camera 184 associated with a traffic signal may communicate video and audio showing other transport 108 speeding or driving erratically prior to running into the rear of transport 104 as atypical data 182C.

The server 112 may receive atypical data 182 from multiple sources, and analyzes the atypical data 182. The analysis may attempt to determine similarities between each of the atypical data 182 received, for example between atypical data 182A and 182B, between atypical data 182B and 182C, and between atypical data 182A and 182C. Because different atypical data 182A, 182B, 182C may include different types of data (i.e. audio, video, photos, SMS messages, emails, or sensor data, etc) from different locations and angles, analysis by the server 112 may include correlation of the different atypical data 182. For example, if atypical data 182A indicates a collision between other transport 108 and transport 104, atypical data 182B and 182C should be similarly reviewed and analyzed for correlated evidence of a same collision. In one embodiment, the analyzed data associated with each of the plurality of devices 108, 116, 184 may be over a minimum threshold, where the minimum threshold may reflect one or more of a degree of damage to the transport 104 such that the transport 104 is not likely able to move on its own and there are likely injuries to one or more transport 104 occupants. In another embodiment, analyzing the atypical data 182 may include the server 112 determining a state of the transport 104 based on data collected by each device of the plurality of devices 108, 116, 184 at a particular time of the various times. The state may be related to the event, and a degree of atypical data 182 may relate to the severity of the event.

The server 112 next forms a consensus based on the analyzed atypical data 182 to determine a severity of the event. In one embodiment, the consensus may be established from identical or similar analysis results from a majority of atypical data 182A, 182B, 182C. In another embodiment, the consensus may be based on a majority of the plurality of devices 108, 116, 184 providing atypical data 182 within a common range, where the common range may correspond to the severity of the event. In another embodiment, a blockchain network may include the server 112, transport or vehicle 104, other transport 108, other devices 116A, 116B, and camera 184. The server 112 may create and store a blockchain transaction related to the event in a blockchain ledger. The blockchain transaction may be based on one or more of the received data, the analyzed data, a location of the plurality of devices, a type of the plurality of devices, the various times, a type of a severity of the event, and/or a type of an action to take.

In one embodiment, after forming the consensus the server 112 may determine an action to take based on the severity of the event. In another embodiment utilizing a blockchain network, the server 112 may execute a smart contract between the server 112 and the transport 104 related to the action to take. In another embodiment, the server 112 may provide a notification 186 to the transport 104 in response to the severity of the event is low, provide a notification 186 to the plurality of devices 108, 116, 184 in response to the severity of the event is moderate, and/or contact 186 one or more first responders in response to the severity of the event is high. In one embodiment, the server 112 may send the action to take to the transport 104 based on the severity of the event. In another embodiment, the server 112 may send the action to take to the plurality of devices 108, 116, 184 and/or a device associated with the transport 104 or an occupant of the transport 104.

Figure 2A:
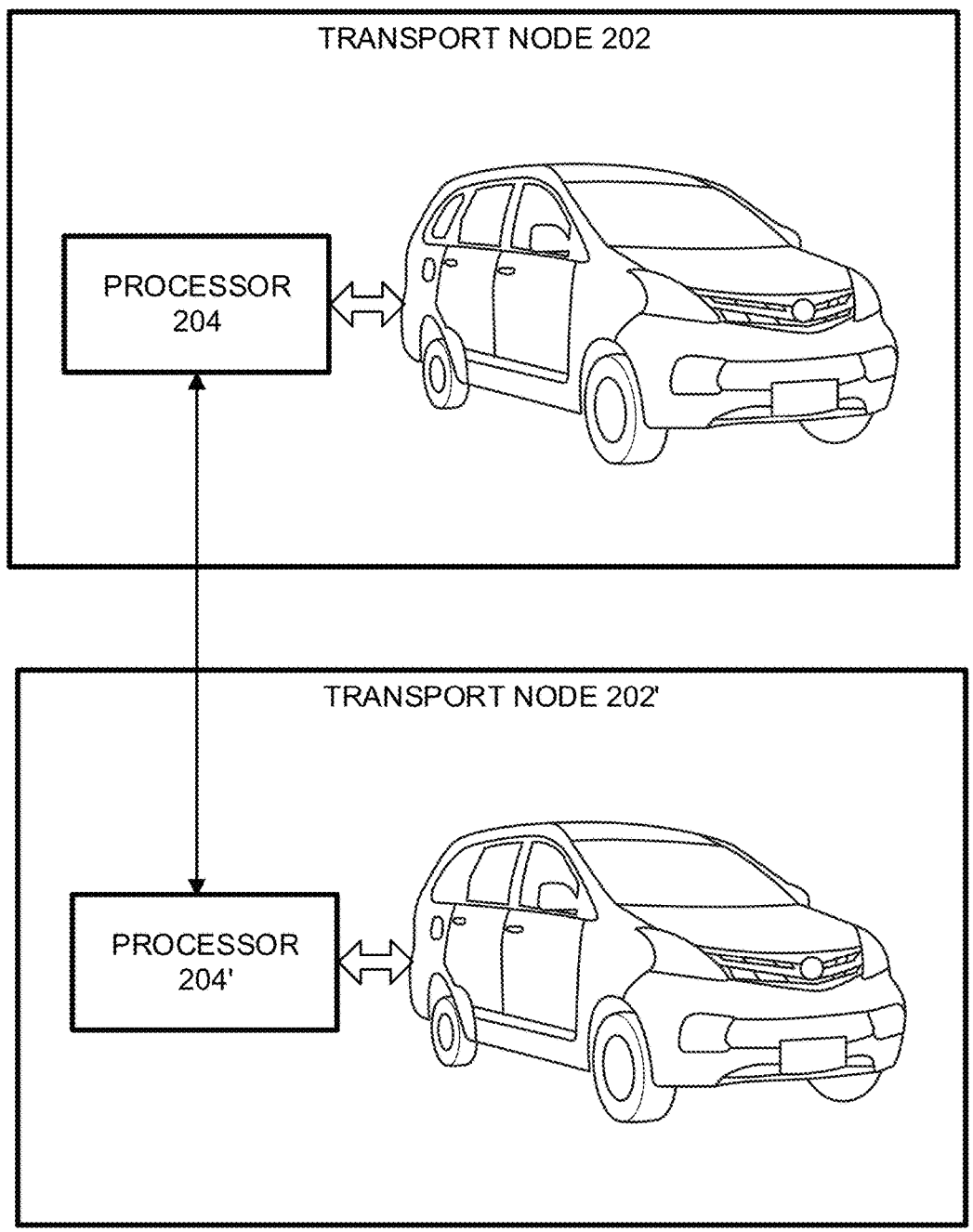
FIG. 2A illustrates a transport network diagram, according to example embodiments.

FIG. 2A illustrates a transport network diagram 200, according to example embodiments. The network comprises elements including a transport node 202 including a processor 204, as well as a transport node 202' including a processor 204'. The transport nodes 202, 202' communicate with one another via the processors 204, 204', as well as other elements (not shown) including transceivers, transmitters, receivers, storage, sensors and other elements capable of providing communication. The communication between the transport nodes 202, 202' can occur directly, via a private and/or a public network (not shown) or via other transport nodes and elements comprising one or more of a processor, memory, and software. Although depicted as single transport nodes and processors, a plurality of transport nodes and processors may be present. One or more of the applications, features, steps, solutions, etc., described and/or depicted herein may be utilized and/or provided by the instant elements.

Figure 2B:
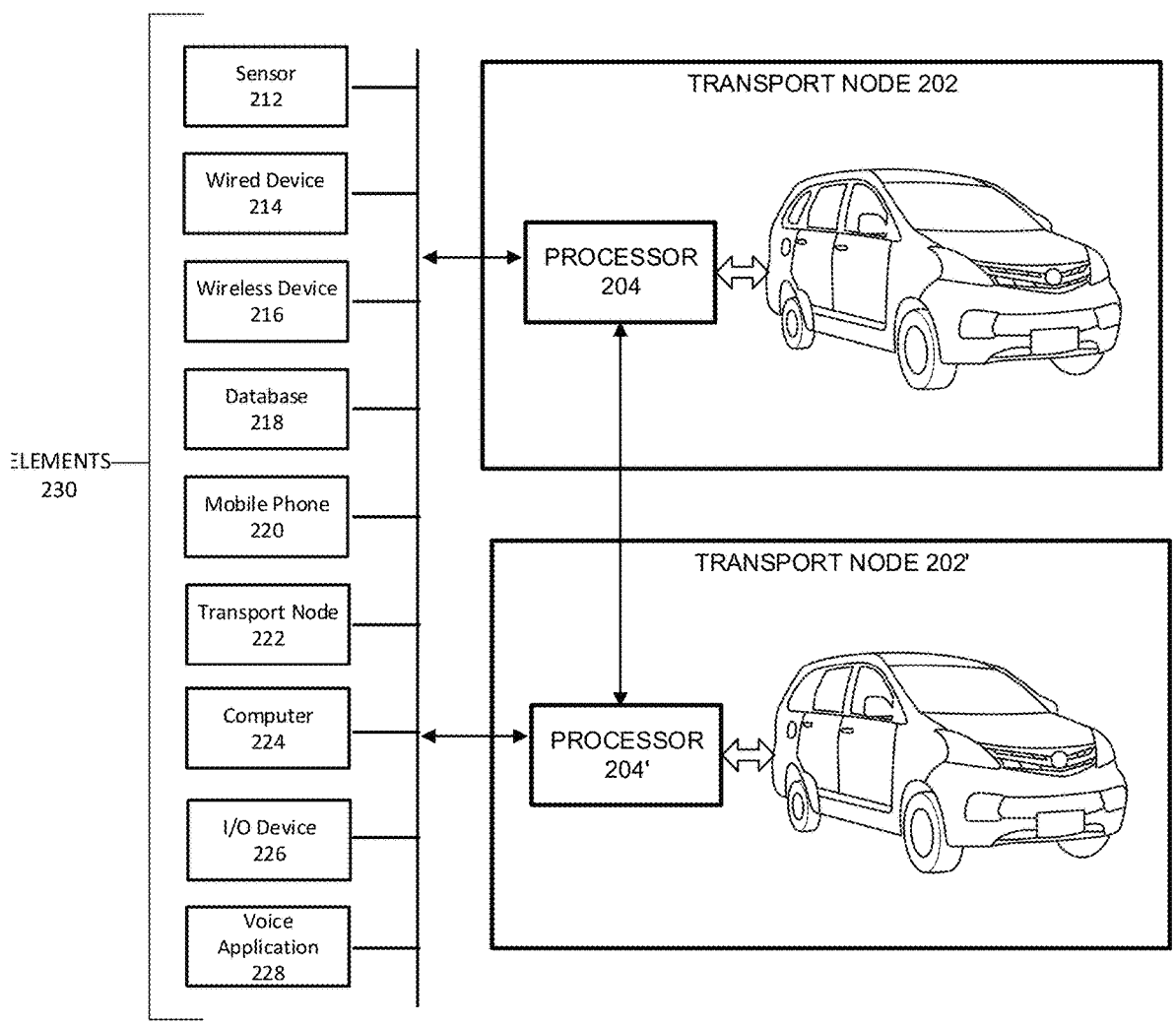
FIG. 2B illustrates another transport network diagram, according to example embodiments.

FIG. 2B illustrates another transport network diagram 210, according to example embodiments. The network comprises elements including a transport node 202 including a processor 204, as well as a transport node 202' including a processor 204'. The transport nodes 202, 202' communicate with one another via the processors 204, 204', as well as other elements (not shown) including transceivers, transmitters, receivers, storage, sensors and other elements capable of providing communication. The communication between the transport nodes 202, 202' can occur directly, via a private and/or a public network (not shown) or via other transport nodes and elements comprising one or more of a processor, memory, and software. The processors 204, 204' can further communicate with one or more elements 230 including sensor 212, wired device 214, wireless device 216, database 218, mobile phone 220, transport node 222, computer 224, I/O device 226 and voice application 228. The processors 204, 204' can further communicate with elements comprising one or more of a processor, memory, and software.

Although depicted as single transport nodes, processors and elements, a plurality of transport nodes, processors and elements may be present. Information or communication can occur to and/or from any of the processors 204, 204' and elements 230. For example, the mobile phone 220 may provide information to the processor 204, which may initiate the transport node 202 to take an action, may further provide the information or additional information to the processor 204' which may initiate the transport node 202' to take an action, may further provide the information or additional information to the mobile phone 220, the transport node 222, and/or the computer 224. One or more of the applications, features, steps, solutions, etc., described and/or depicted herein may be utilized and/or provided by the instant elements.

Figure 2C:
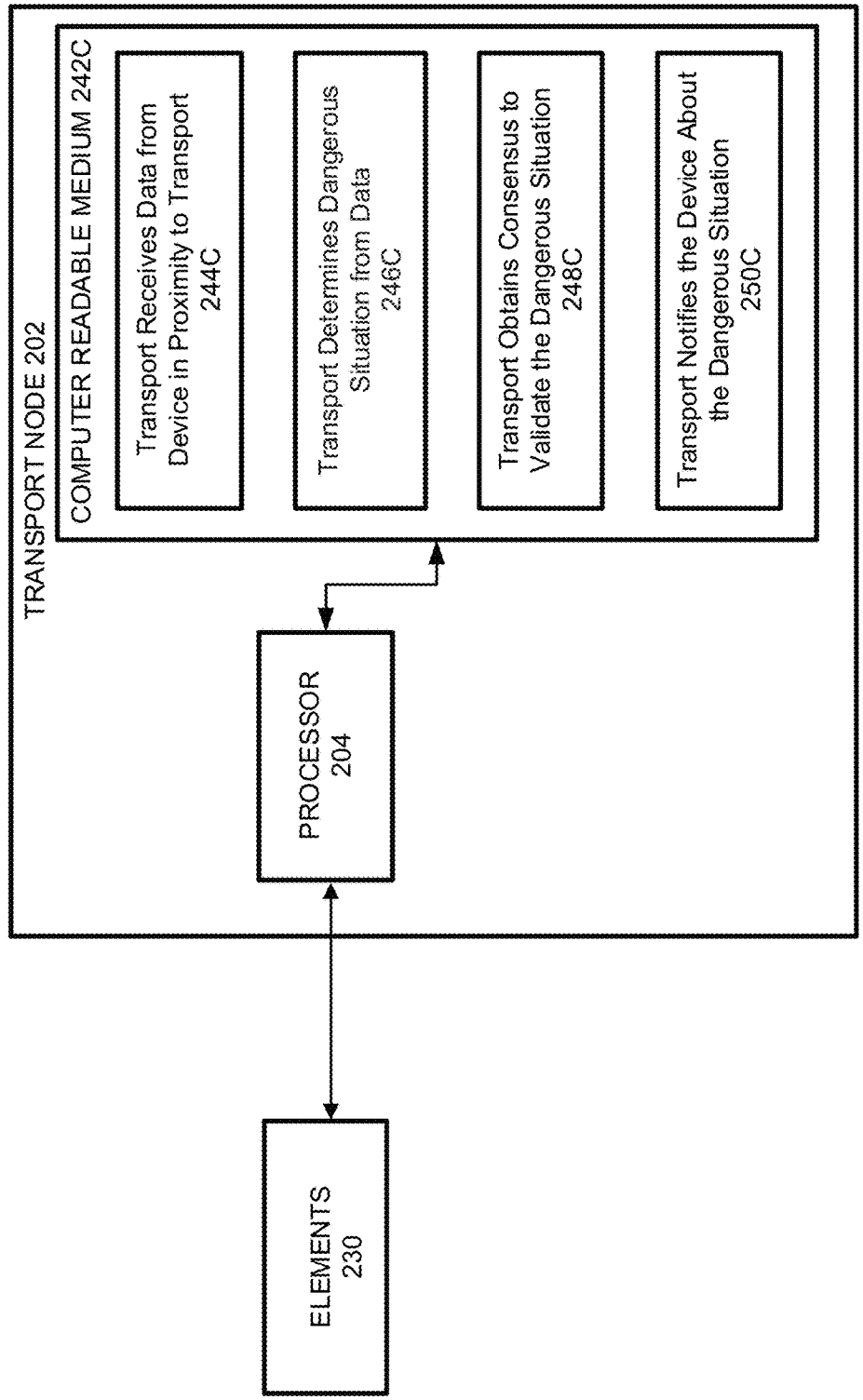
FIG. 2C illustrates yet another transport network diagram, according to example embodiments.

FIG. 2C illustrates yet another transport network diagram 240, according to example embodiments. The network comprises elements including a transport node 202 including a processor 204 and a non-transitory computer readable medium 242C. The processor 204 is communicably coupled to the computer readable medium 242C and elements 230 (which were depicted in FIG. 2B).

The processor 204 performs one or more of the following steps. At step 244C, a transport 104 receives data 120 from a device 118 in proximity to the transport 104. At step 246C, the transport 104 determines a dangerous situation from the data 120. At step 248C, the transport 104 obtains consensus to validate the dangerous situation. Finally, at step 250C, the transport 104 notifies the device 118 about the dangerous situation 122.

Figure 2D:
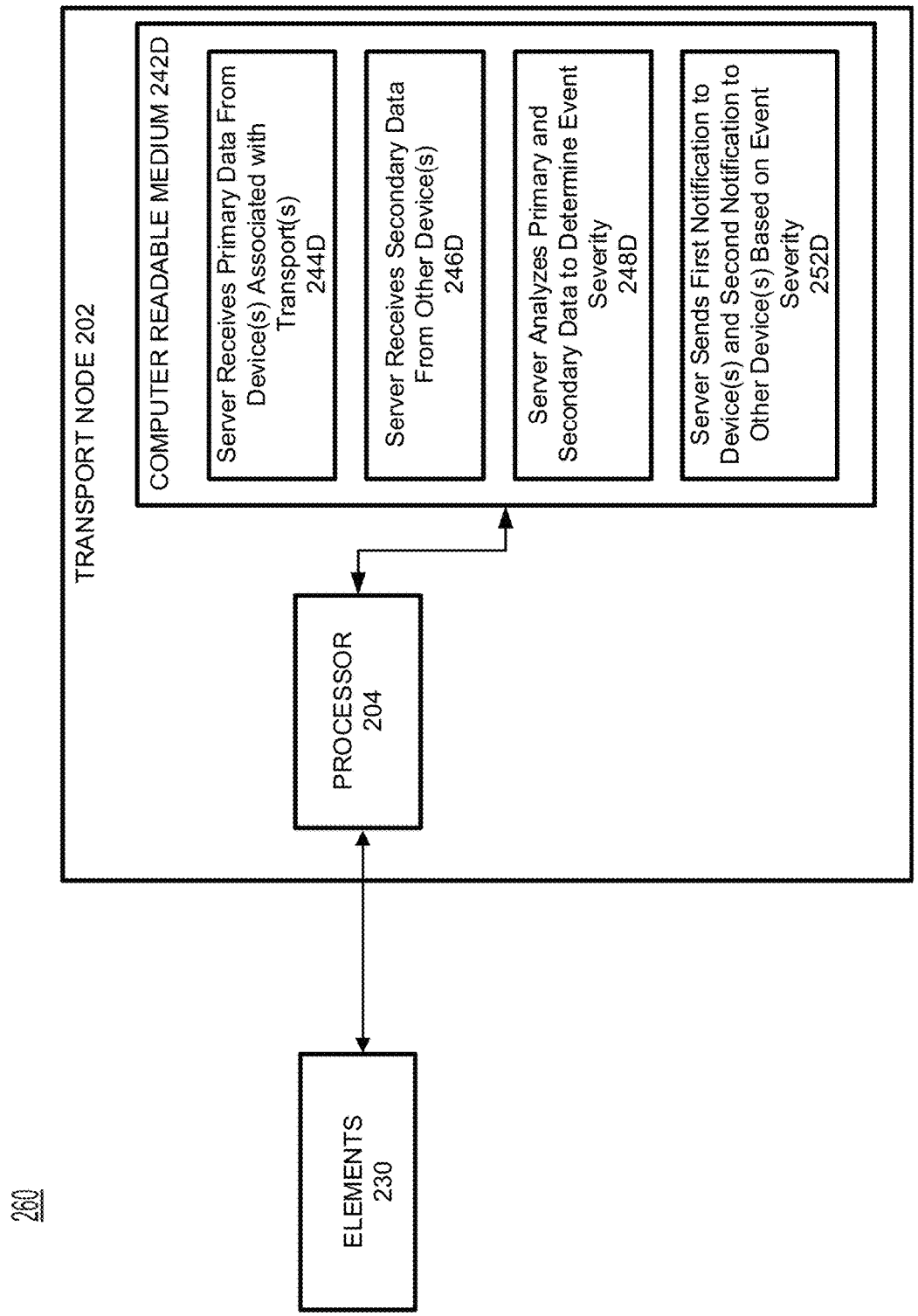
FIG. 2D illustrates a further transport network diagram, according to example embodiments.

FIG. 2D illustrates a further transport network diagram 260, according to example embodiments. The network comprises elements including a transport node 202 including a processor 204 and a non-transitory computer readable medium 242D. The processor 204 is communicably coupled to the computer readable medium 242D and elements 230 (which were depicted in FIG. 2B).

The processor 204 performs one or more of the following steps. At step 244D, a server 112 receives primary data 132 from one or more devices associated with the transport 104. At step 246D, the server 112 receives secondary data 134 from one or more other devices 116. At step 248D, the server 112 analyzes the primary 132 and secondary 134 data in order to determine a severity of an event. Finally, at step 252D, the server 112 sends a first notification 136 to one or more devices and a second notification 138 to one or more other devices 116 based on the event severity.

Figure 2E:
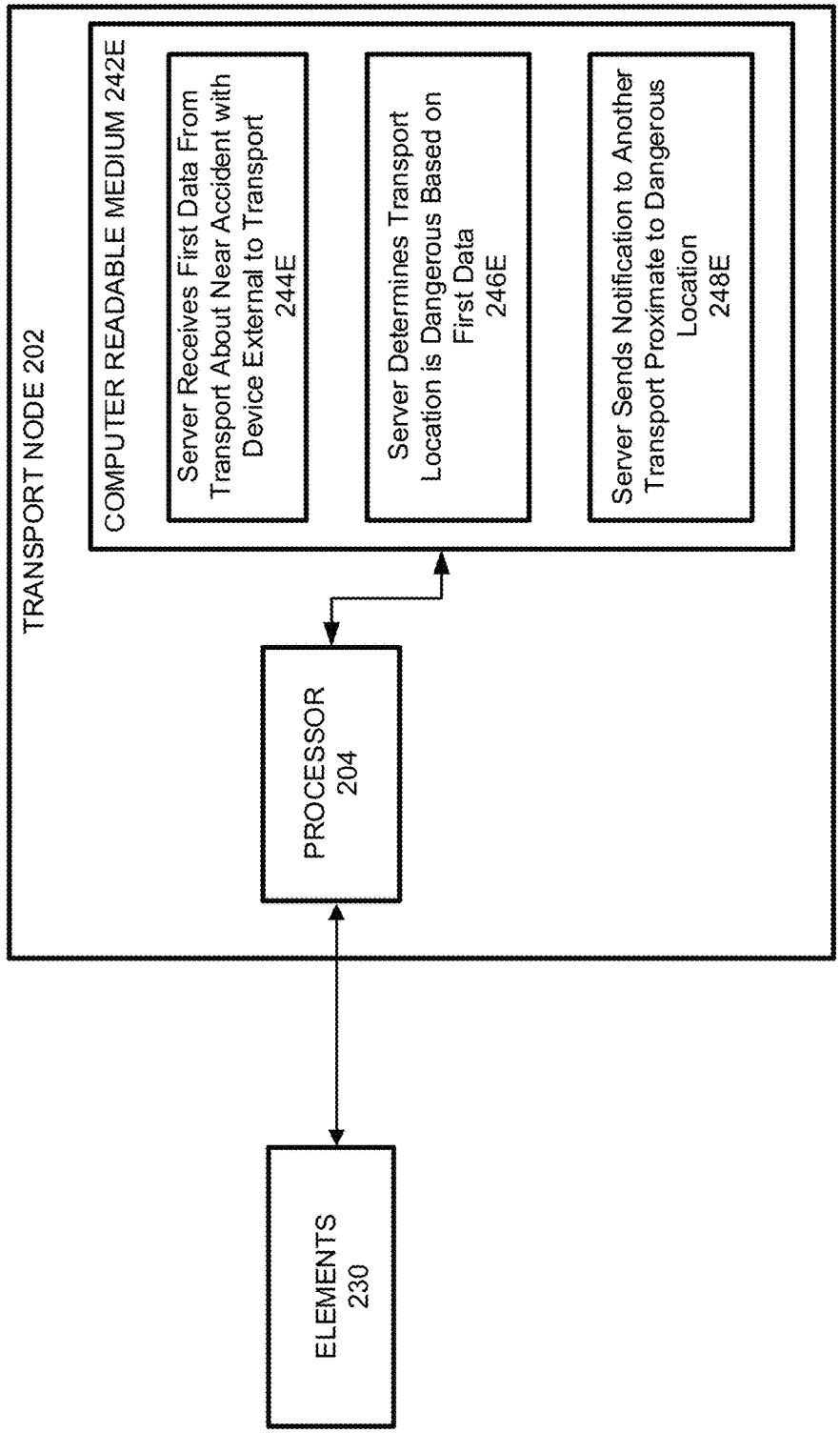
FIG. 2E illustrates a yet further transport network diagram, according to example embodiments.

FIG. 2E illustrates a yet further transport network diagram 270, according to example embodiments. The network comprises elements including a transport node 202 including a processor 204 and a non-transitory computer readable medium 242E. The processor 204 is communicably coupled to the computer readable medium 242E and elements 230 (which were depicted in FIG. 2B).

The processor 204 performs one or more of the following steps. At step 244E, a server 112 receives first data 142 from a transport 104 about a near accident 146 with a device external to the transport 150. At step 246E, the server 112 determines a transport location may be dangerous 144 based on the first data 142. Finally, at step 248E, the server 112 sends a notification 148 to another transport 108 proximate to the dangerous location 144.

Figure 2F:
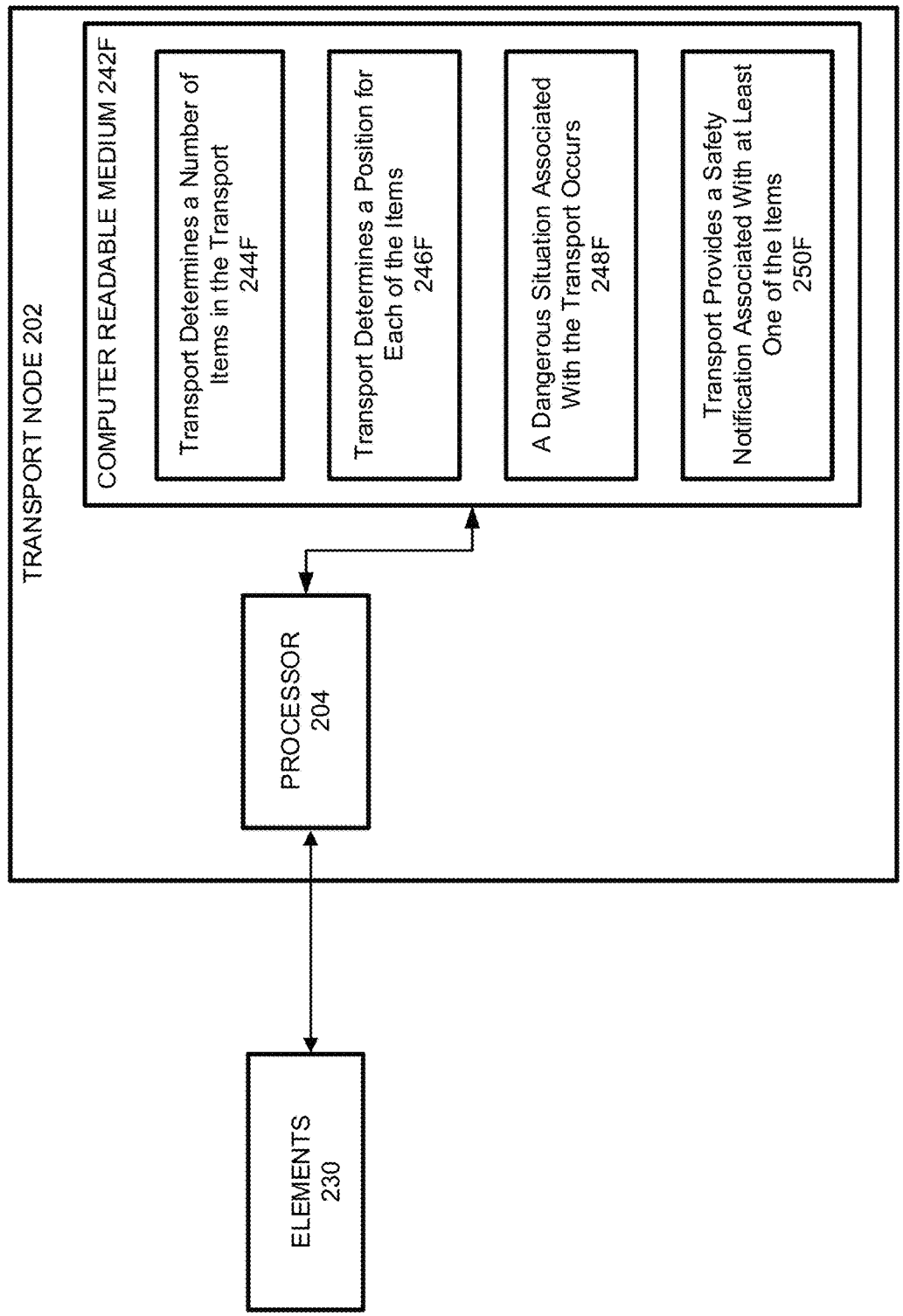
FIG. 2F illustrates a yet further transport network diagram, according to example embodiments.

FIG. 2F illustrates a yet further transport network diagram 280, according to example embodiments. The network comprises elements including a transport node 202 including a processor 204 and a non-transitory computer readable medium 242F. The processor 204 is communicably coupled to the computer readable medium 242F and elements 230 (which were depicted in FIG. 2B).

The processor 204 performs one or more of the following steps. At step 244F, a transport 104 determines a number of items 162, 164 in the transport 104. At step 246F, the transport 104 determines a position for each of the items 162, 164. At step 248F, a dangerous situation associated with the transport 104 occurs. Finally, at step 250F, the transport 104 provides a safety notification associated with one or more of the items 162, 164. The safety notification may include one or more of an audible warning 170 from the transport 104, a text message received by an occupant device 164, and a warning shown on a transport 104 display. In some embodiments, the transport 104 determines the number and position of items and provides the safety notification prior to the transport 104 is started.

Figure 2G:
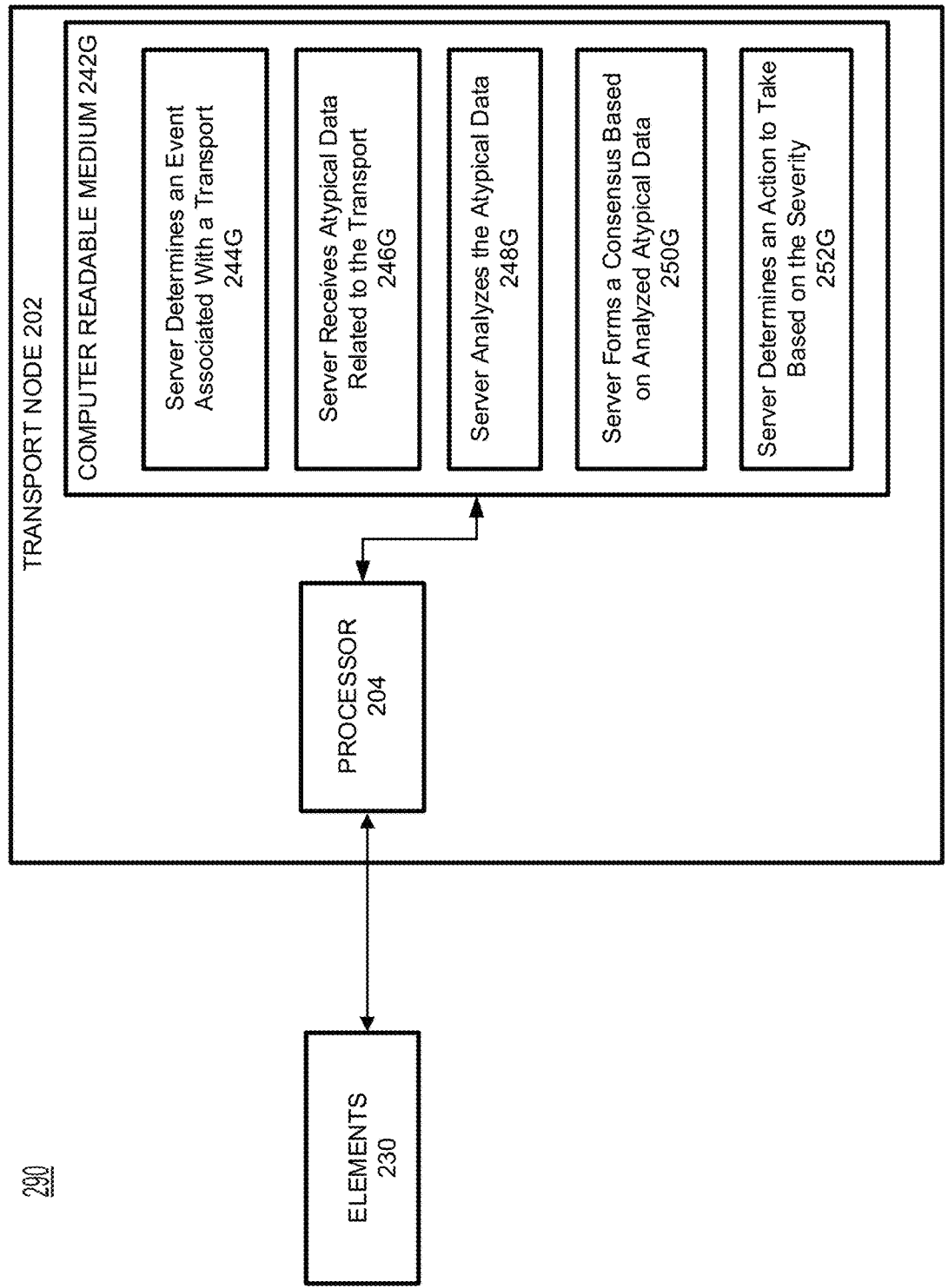
FIG. 2G illustrates a yet further transport network diagram, according to example embodiments.

FIG. 2G illustrates a yet further transport network diagram 290, according to example embodiments. The network comprises elements including a transport node 202 including a processor 204 and a non-transitory computer readable medium 242G. The processor 204 is communicably coupled to the computer readable medium 242G and elements 230 (which were depicted in FIG. 2B).

The processor 204 performs one or more of the following steps. At step 244G, a server 112 determines an event associated with a transport 104. At step 246G, the server 112 receives atypical data 182 related to the transport 104 from a plurality of devices 116 over various times prior to the event. At step 248G, the server 112 analyzes the atypical data 182. At step 250G, the server 112 forms a consensus based on the analyzed atypical data 182 in order to determine a severity of the event. Finally, at step 252G, the server 112 determines an action to take based on the severity.

The processors and/or computer readable media may fully or partially reside in the interior or exterior of the transport nodes. The steps or features stored in the computer readable media may be fully or partially performed by any of the processors and/or elements in any order. Additionally, one or more steps or features may be added, omitted, combined, or performed at a later time, etc.

Figure 3A:
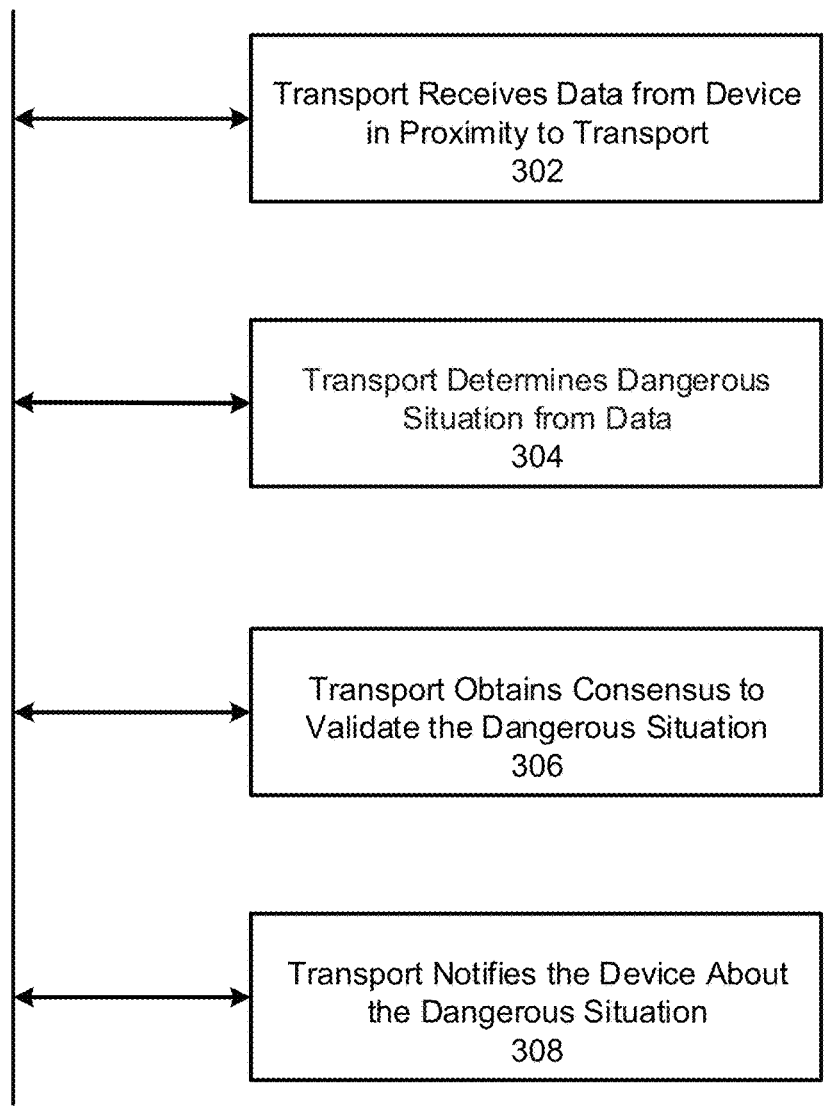
FIG. 3A illustrates a flow diagram, according to example embodiments.

FIG. 3A illustrates a flow diagram 300, according to example embodiments. Referring to FIG. 3A, the process includes one or more of the following steps. At block 302, the transport 104 receives data 120 from a device 118 in proximity to the transport 104. The data 120 may include one or more of a speed, a direction, and a distance of the device 118 from the transport 104. At block 304, the transport 104 determines a dangerous situation from the data 120. At block 306, the transport 104 obtains a consensus to validate the dangerous situation from one or more other devices 116 proximate to the transport 104 and one or more other transports 108 proximate to the transport 104. Finally, at block 308, the transport 104 notifies 122 the device 118, based on the consensus, about the dangerous situation.

Figure 3B:
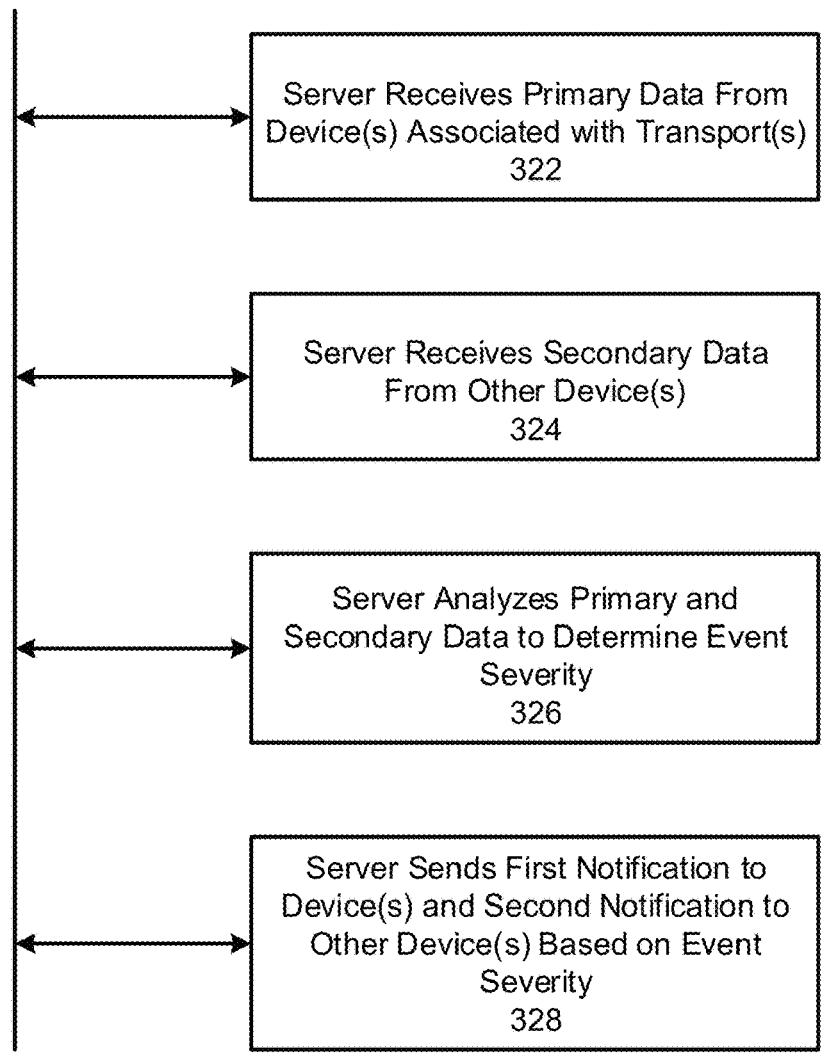
FIG. 3B illustrates another flow diagram, according to example embodiments.

FIG. 3B illustrates another flow diagram 320, according to example embodiments. Referring to FIG. 3B, the process includes one or more of the following steps. At block 322, a server 112 receives primary data 132 related to an event from one or more devices associated with one or more transports 104. The one or more transports 104 may include the devices inherently, or the devices may be associated with one or more transport 104 occupants. At block 324, the server 112 receives secondary data 134 from other device(s) 116 in proximity to the event. At block 326, the server 112 analyzes the primary 132 and secondary 134 data to determine an event severity. Finally, at block 328, the server 112 sends a first notification 136 to the device(s) associated with the primary data 132 and a second notification 138 to the other device(s) 116 associated with the secondary data 134, based on the event severity.

Figure 3C:
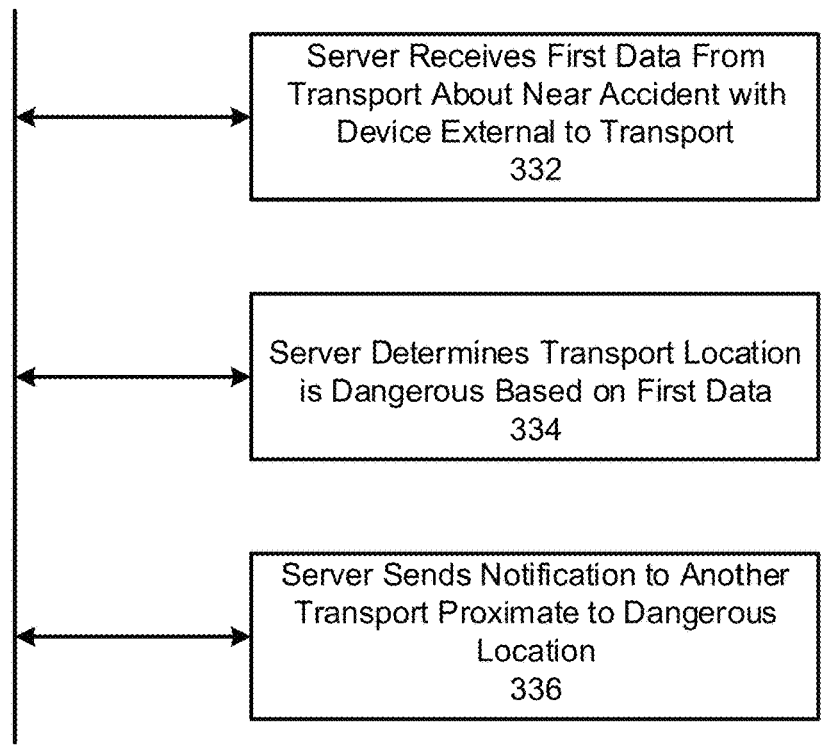
FIG. 3C illustrates yet another flow diagram, according to example embodiments.

FIG. 3C illustrates yet another flow diagram 330, according to example embodiments. Referring to FIG. 3C, the process includes one or more of the following steps. At block 332, a server 112 receives first data 142 from a transport 104 experiencing a near-accident 146 with a device external to the transport 150. The first data 142 may include a location of the transport 104 and information related to maneuvering of the transport 104. At block 334, the server 112 determines the transport location is dangerous 144 and maneuvering of the transport 104 constitutes the near accident 146, based on the first data 142. Finally, at block 336, the server 112 sends a first notification 148 to another transport 108 proximate to the dangerous location 144. The first notification 148 includes information related to the dangerous location 144 and the near accident 146.

Figure 3D:
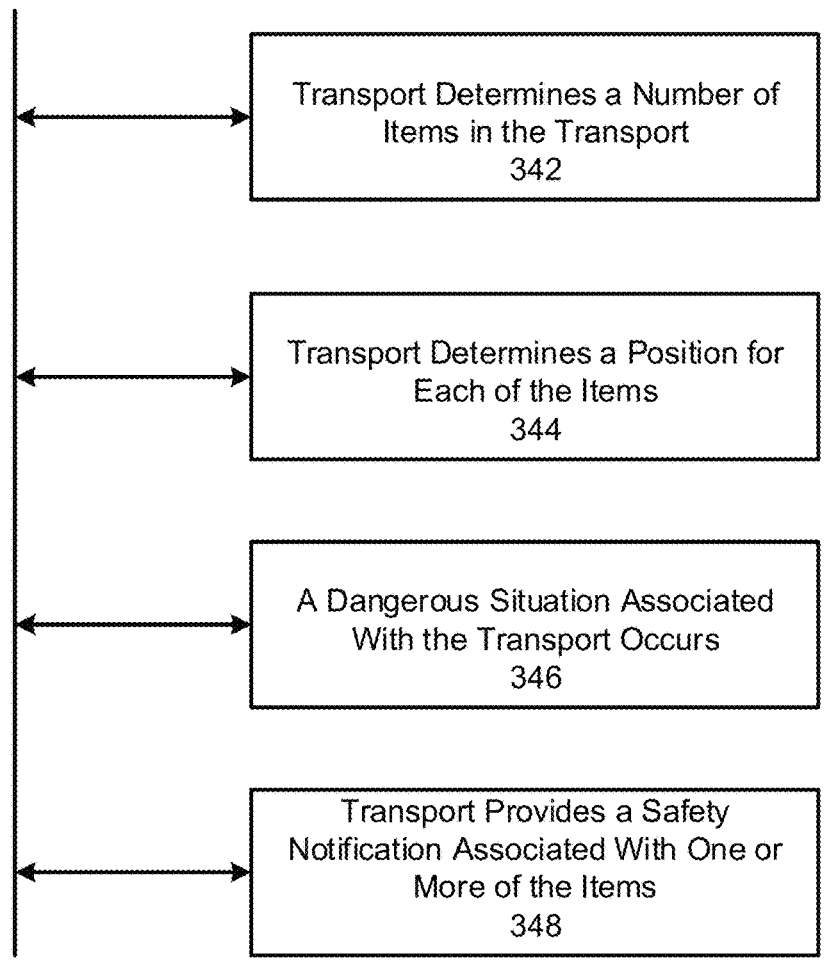
FIG. 3D illustrates yet another flow diagram, according to example embodiments.

FIG. 3D illustrates yet another flow diagram 340, according to example embodiments. Referring to FIG. 3D, the process includes one or more of the following steps. At block 342, a transport 104 determines a number of items 162, 164 in the transport 104. At block 344, the transport 104 determines a position for each of the items 162, 164. At block 346, a dangerous situation associated with the transport 104 occurs. Finally, at block 348, the transport 104 provides a safety notification associated with one or more of the items 162, 164. The safety notification may include one or more of an audible warning 170 from the transport 104, a text message received by an occupant device 164, and a warning shown on a transport 104 display. In some embodiments, the transport 104 determines the number and position of items and provides the safety notification prior to the transport 104 is started.

Figure 3E:
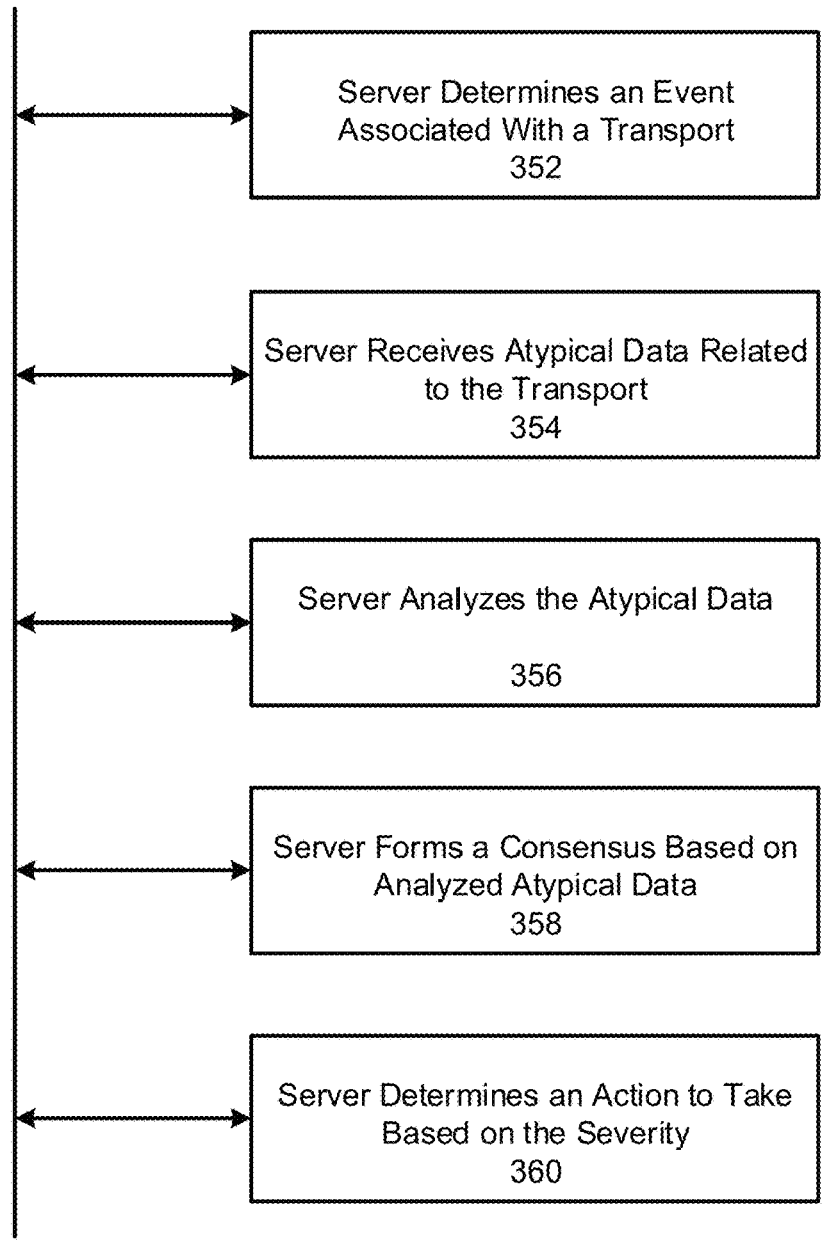
FIG. 3E illustrates yet another flow diagram, according to example embodiments.

FIG. 3E illustrates yet another flow diagram 350, according to example embodiments. Referring to FIG. 3E, the process includes one or more of the following steps. At block 352, a server 112 determines an event associated with a transport 104. At block 354, the server 112 receives atypical data 182 related to the transport 104 from a plurality of devices 116 over various times prior to the event. At block 356, the server 112 analyzes the atypical data 182. At block 358, the server 112 forms a consensus based on the analyzed atypical data 182 in order to determine a severity of the event. Finally, at block 360, the server 112 determines an action to take based on the severity.

Figure 4:
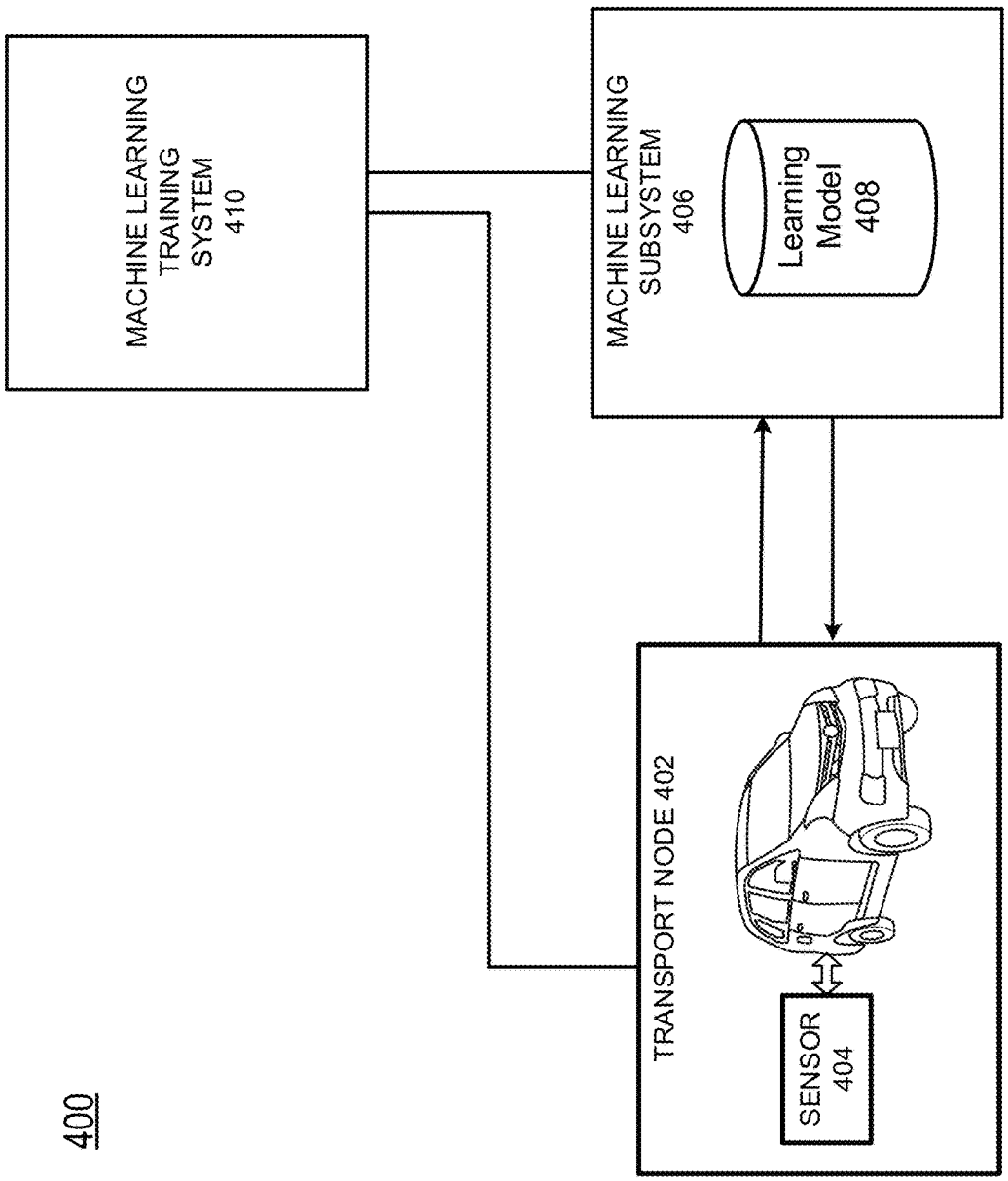
FIG. 4 illustrates a machine learning transport network diagram, according to example embodiments.

FIG. 4 illustrates a machine learning transport network diagram 400, according to example embodiments. The network 400 includes a transport node 402 that interfaces with a machine learning subsystem 406. The transport node includes one or more sensors 404.

The machine learning subsystem 406 contains a learning model 408 which is a mathematical artifact created by a machine learning training system 410 that generates predictions by finding patterns in one or more training data sets. In some embodiments, the machine learning subsystem 406 resides in the transport node 402. In other embodiments, the machine learning subsystem 406 resides outside of the transport node 402.

The transport node 402 sends data from the one or more sensors 404 to the machine learning subsystem 406. The machine learning subsystem 406 provides the one or more sensor 404 data to the learning model 408, which returns one or more predictions. The machine learning subsystem 406 sends one or more instructions to the transport node 402 based on the predictions from the learning model 408.

In a further embodiment, the transport node 402 may send the one or more sensor 404 data to the machine learning training system 410. In yet another embodiment, the machine learning subsystem 406 may sent the sensor 404 data to the machine learning subsystem 410. One or more of the applications, features, steps, solutions, etc., described and/or depicted herein may utilize the machine learning network 400 as described herein.

Figure 5A:
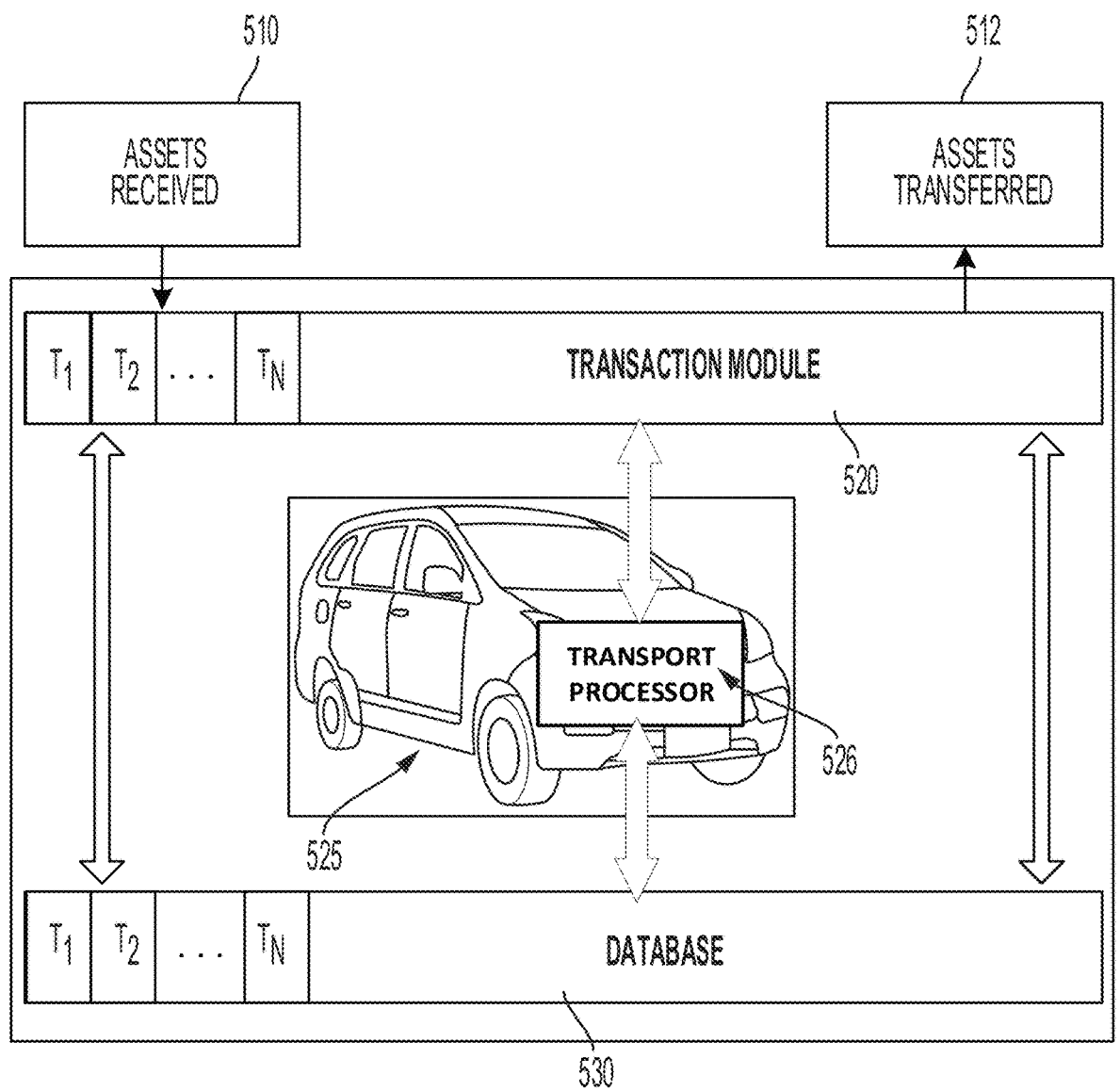
FIG. 5A illustrates an example vehicle configuration for managing database transactions associated with a vehicle, according to example embodiments.

FIG. 5A illustrates an example vehicle configuration 500 for managing database transactions associated with a vehicle, according to example embodiments. Referring to FIG. 5A, as a particular transport/vehicle 525 is engaged in transactions (e.g., vehicle service, dealer transactions, delivery/pickup, transportation services, etc.), the vehicle may receive assets 510 and/or expel/transfer assets 512 according to a transaction(s). A transport processor 526 resides in the vehicle 525 and communication exists between the transport processor 526, a database 530, a transport processor 526 and the transaction module 520. The transaction module 520 may record information, such as assets, parties, credits, service descriptions, date, time, location, results, notifications, unexpected events, etc. Those transactions in the transaction module 520 may be replicated into a database 530. The database 530 can be one of a SQL database, an RDBMS, a relational database, a non-relational database, a blockchain, a distributed ledger, and may be on board the transport, may be off board the transport, may be accessible directly and/or through a network, or be accessible to the transport.

Figure 5B:
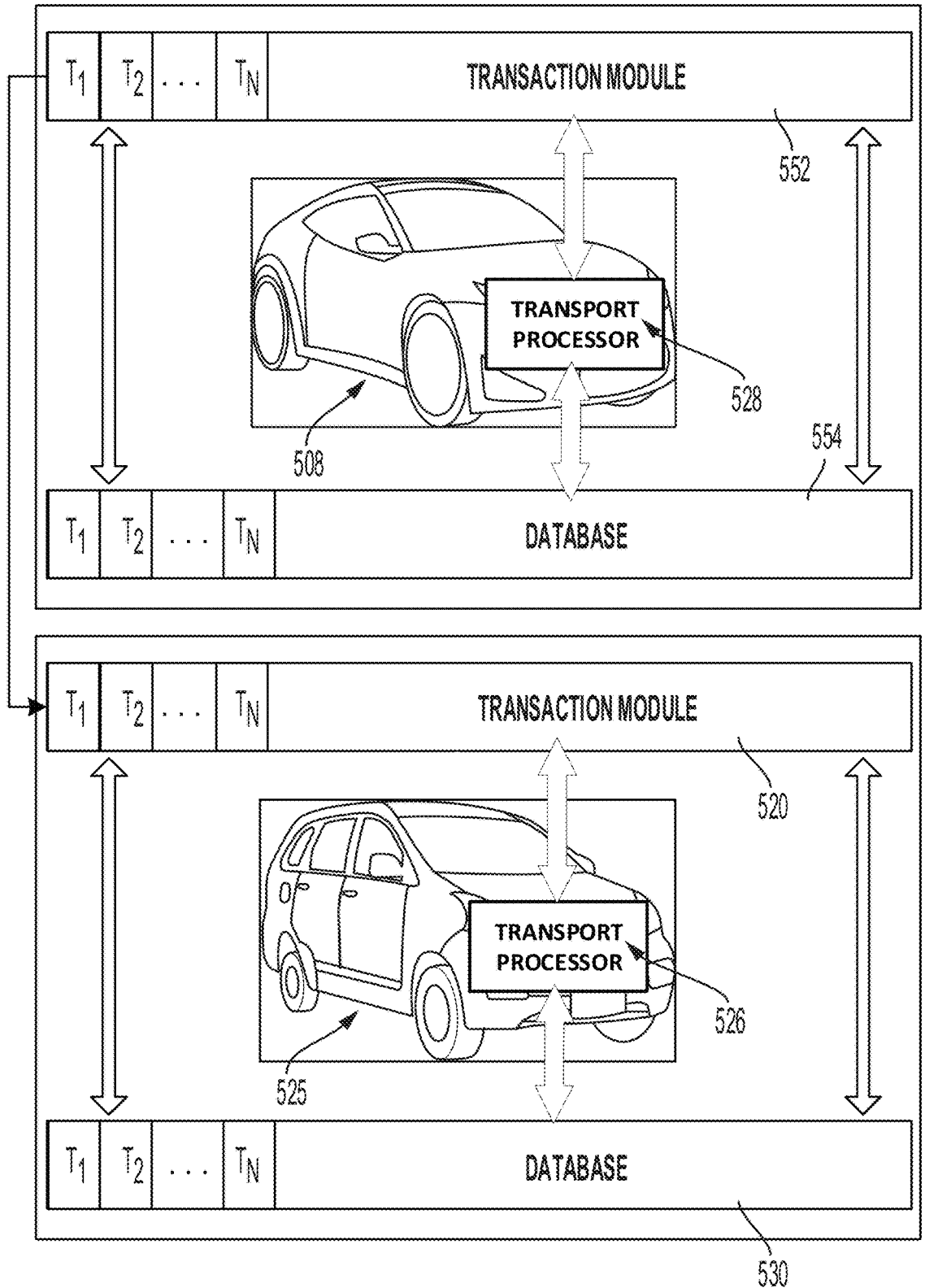
FIG. 5B illustrates another example vehicle configuration for managing database transactions conducted among various vehicles, according to example embodiments.

FIG. 5B illustrates an example vehicle configuration 550 for managing database transactions conducted among various vehicles, according to example embodiments. The vehicle 525 may engage with another vehicle 508 to perform various actions such as to share, transfer, acquire service calls, etc. when the vehicle has reached a status where the services need to be shared with another vehicle. For example, the vehicle 508 may be due for a battery charge and/or may have an issue with a tire and may be in route to pick up a package for delivery. A transport processor 528 resides in the vehicle 508 and communication exists between the transport processor 528, a database 554, a transport processor 528 and the transaction module 552. The vehicle 508 may notify another vehicle 525 which is in its network and which operates on its blockchain member service. A transport processor 526 resides in the vehicle 525 and communication exists between the transport processor 526, a database 530, the transport processor 526 and a transaction module 520. The vehicle 525 may then receive the information via a wireless communication request to perform the package pickup from the vehicle 508 and/or from a server (not shown). The transactions are logged in the transaction modules 552 and 520 of both vehicles. The credits are transferred from vehicle 508 to vehicle 525 and the record of the transferred service is logged in the database 530/554 assuming that the blockchains are different from one another, or, are logged in the same blockchain used by all members. The database 554 can be one of a SQL database, an RDBMS, a relational database, a non-relational database, a blockchain, a distributed ledger, and may be on board the transport, may be off board the transport, may be accessible directly and/or through a network.

Figure 6A:
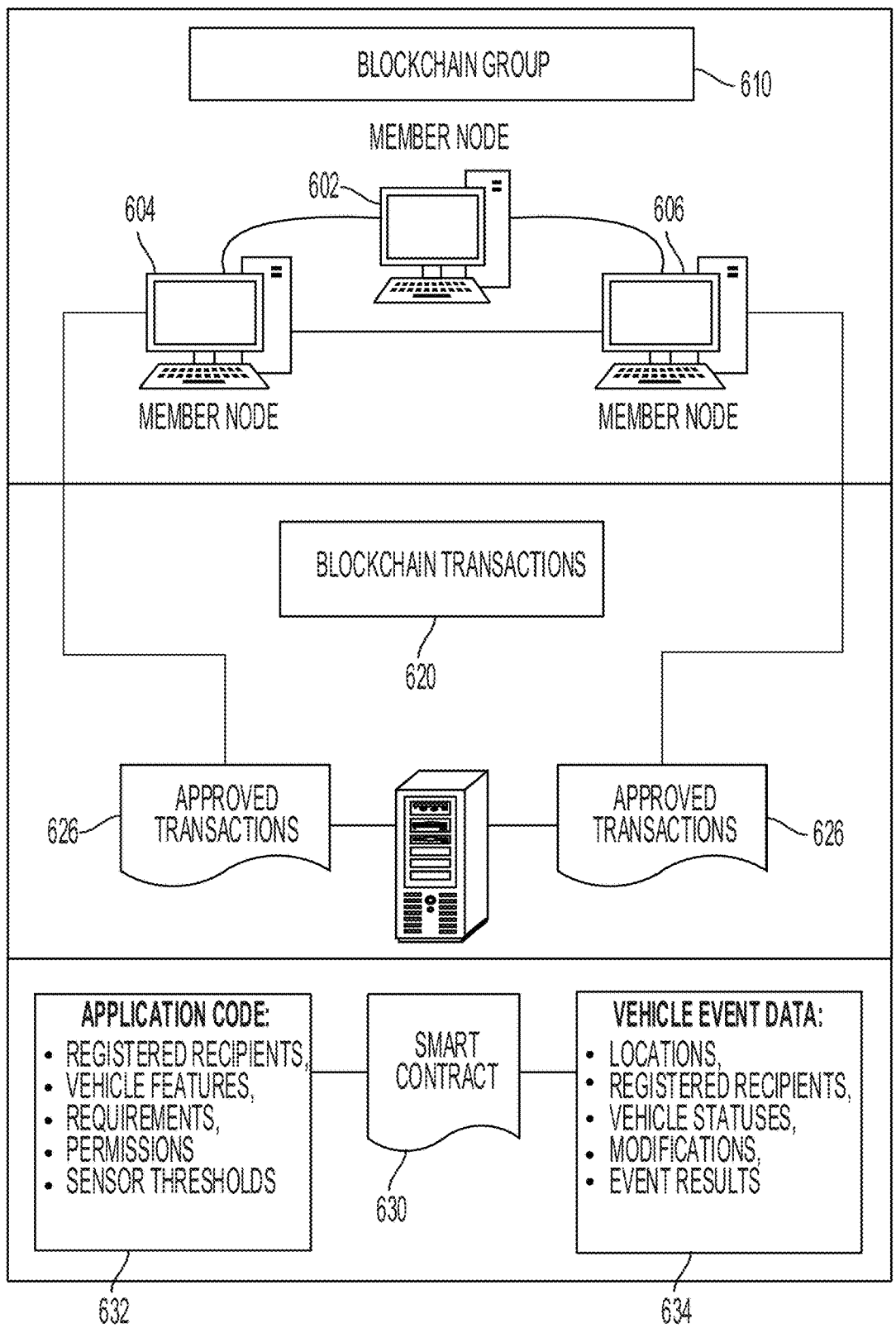
FIG. 6A illustrates a blockchain architecture configuration, according to example embodiments.

FIG. 6A illustrates a blockchain architecture configuration 600, according to example embodiments. Referring to FIG. 6A, the blockchain architecture 600 may include certain blockchain elements, for example, a group of blockchain member nodes 602-606 as part of a blockchain group 610. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 620 are stored in memory of computers as the transactions are received and approved by the consensus model dictated by the members' nodes. Approved transactions 626 are stored in current blocks of the blockchain and committed to the blockchain via a committal procedure which includes performing a hash of the data contents of the transactions in a current block and referencing a previous hash of a previous block. Within the blockchain, one or more smart contracts 630 may exist that define the terms of transaction agreements and actions included in smart contract executable application code 632, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered and a certain parameter, such as a vehicle charge level, may be identified as being above/below a particular threshold for a particular period of time, then the result may be a change to a current status which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 634, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 630, which are then stored in a blockchain. For example, sensor thresholds stored in the smart contract can be used as the basis for whether a detected service is necessary and when and where the service should be performed.

Figure 6B:
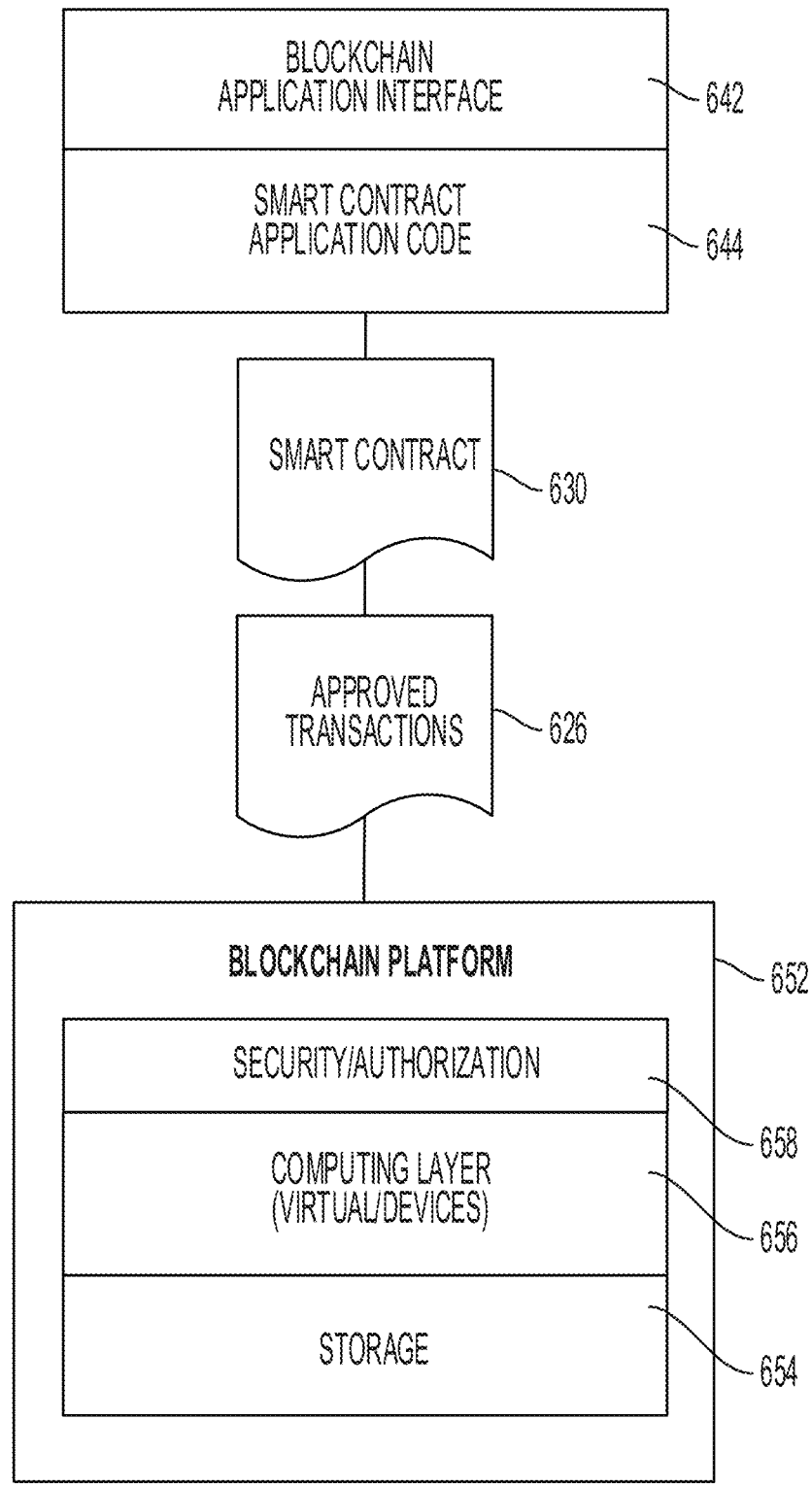
FIG. 6B illustrates another blockchain configuration, according to example embodiments.

FIG. 6B illustrates a shared ledger configuration, according to example embodiments. Referring to FIG. 6B, the blockchain logic example 640 includes a blockchain application interface 642 as an API or plug-in application that links to the computing device and execution platform for a particular transaction. The blockchain configuration 640 may include one or more applications which are linked to application programming interfaces (APIs) to access and execute stored program/application code (e.g., smart contract executable code, smart contracts, etc.) which can be created according to a customized configuration sought by participants and can maintain their own state, control their own assets, and receive external information. This can be deployed as an entry and installed, via appending to the distributed ledger, on all blockchain nodes.

The smart contract application code 644 provides a basis for the blockchain transactions by establishing application code which when executed causes the transaction terms and conditions to become active. The smart contract 630, when executed, causes certain approved transactions 626 to be generated, which are then forwarded to the blockchain platform 652. The platform includes a security/authorization 658, computing devices which execute the transaction management 656 and a storage portion 654 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 6A and 6B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code which is registered, stored, and/or replicated with a blockchain (e.g., distributed network of blockchain peers). An entry is an execution of the smart contract code, which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 6C:
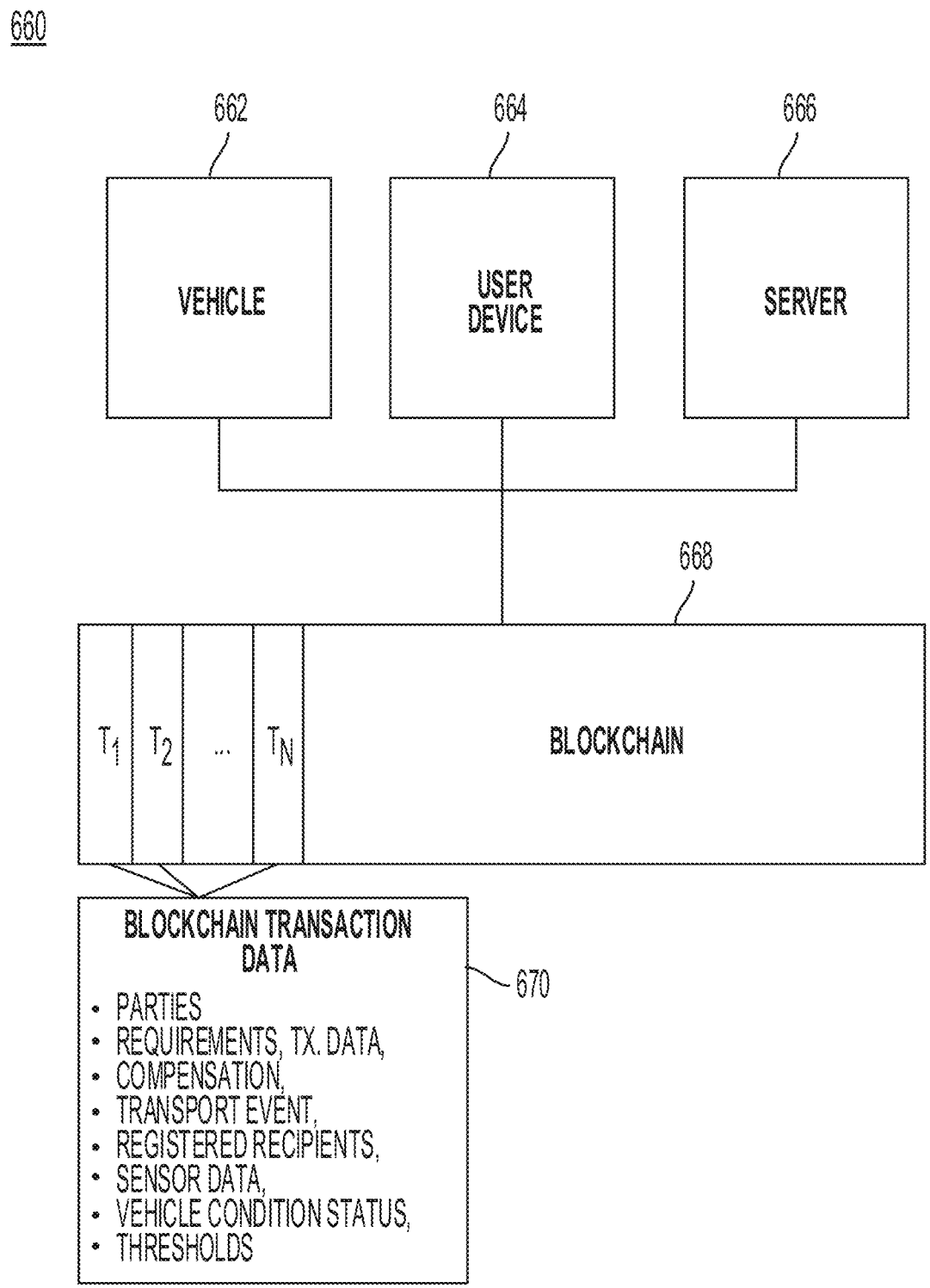
FIG. 6C illustrates a blockchain configuration for storing blockchain transaction data, according to example embodiments.

FIG. 6C illustrates a blockchain configuration for storing blockchain transaction data, according to example embodiments. Referring to FIG. 6C, the example configuration 660 provides for the vehicle 662, the user device 664 and a server 666 sharing information with a distributed ledger (i.e., blockchain) 668. The server may represent a service provider entity inquiring with a vehicle service provider to share user profile rating information in the event that a known and established user profile is attempting to rent a vehicle with an established rated profile. The server 666 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 670 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 6D:
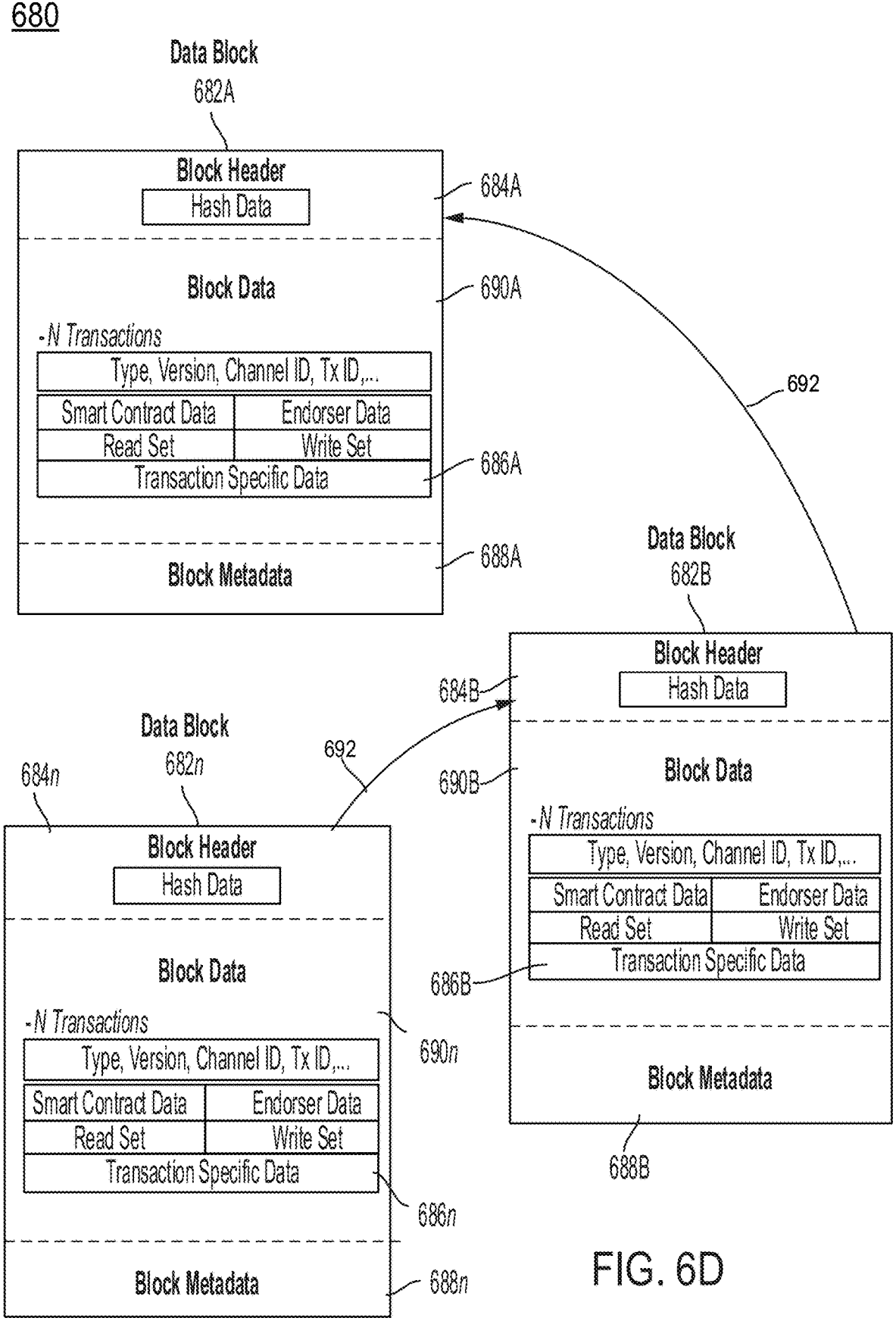
FIG. 6D illustrates example data blocks, according to example embodiments.

FIG. 6D illustrates blockchain blocks 680 that can be added to a distributed ledger, according to example embodiments, and contents of block structures 682A to 682n. Referring to FIG. 6D, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers, which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain which stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 6D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts, which simulate the entry proposals. When an endorsing node endorses an entry, the endorsing nodes create an entry endorsement which is a signed response from the endorsing node to the client application indicating the endorsement of the simulated entry. The method of endorsing an entry depends on an endorsement policy, which may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 682A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 6D, a block 682A (also referred to as a data block) that is stored on the blockchain and/or the distributed ledger may include multiple data segments such as a block header 684A to 684*n*, transaction specific data 686A to 686*n*, and block metadata 688A to 688*n*. It should be appreciated that the various depicted blocks and their contents, such as block 682A and its contents are merely for purposes of an example and are not meant to limit the scope of the example embodiments. In some cases, both the block header 684A and the block metadata 688A may be smaller than the transaction specific data 686A which stores entry data; however, this is not a requirement. The block 682A may store transactional information of N entries (e.g., 100, 500, 1000, 2000, 3000, etc.) within the block data 690A to 690*n*. The block 682A may also include a link to a previous block (e.g., on the blockchain) within the block header 684A. In particular, the block header 684A may include a hash of a previous block's header. The block header 684A may also include a unique block number, a hash of the block data 690A of the current block 682A, and the like. The block number of the block 682A may be unique and assigned in an incremental/sequential order starting from zero. The first block in the blockchain may be referred to as a genesis block, which includes information about the blockchain, its members, the data stored therein, etc.

The block data 690A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 690A may also store transaction specific data 686A which adds additional information to the hash-linked chain of blocks in the blockchain. Accordingly, the data 686A can be stored in an immutable log of blocks on the distributed ledger. Some of the benefits of storing such data 686A are reflected in the various embodiments disclosed and depicted herein. The block metadata 688A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 690A and a validation code identifying whether an entry was valid/invalid.

The other blocks 682B to 682*n* in the blockchain also have headers, files, and values. However, unlike the first block 682A, each of the headers 684A to 684*n* in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 692, to establish an auditable and immutable chain-of-custody.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
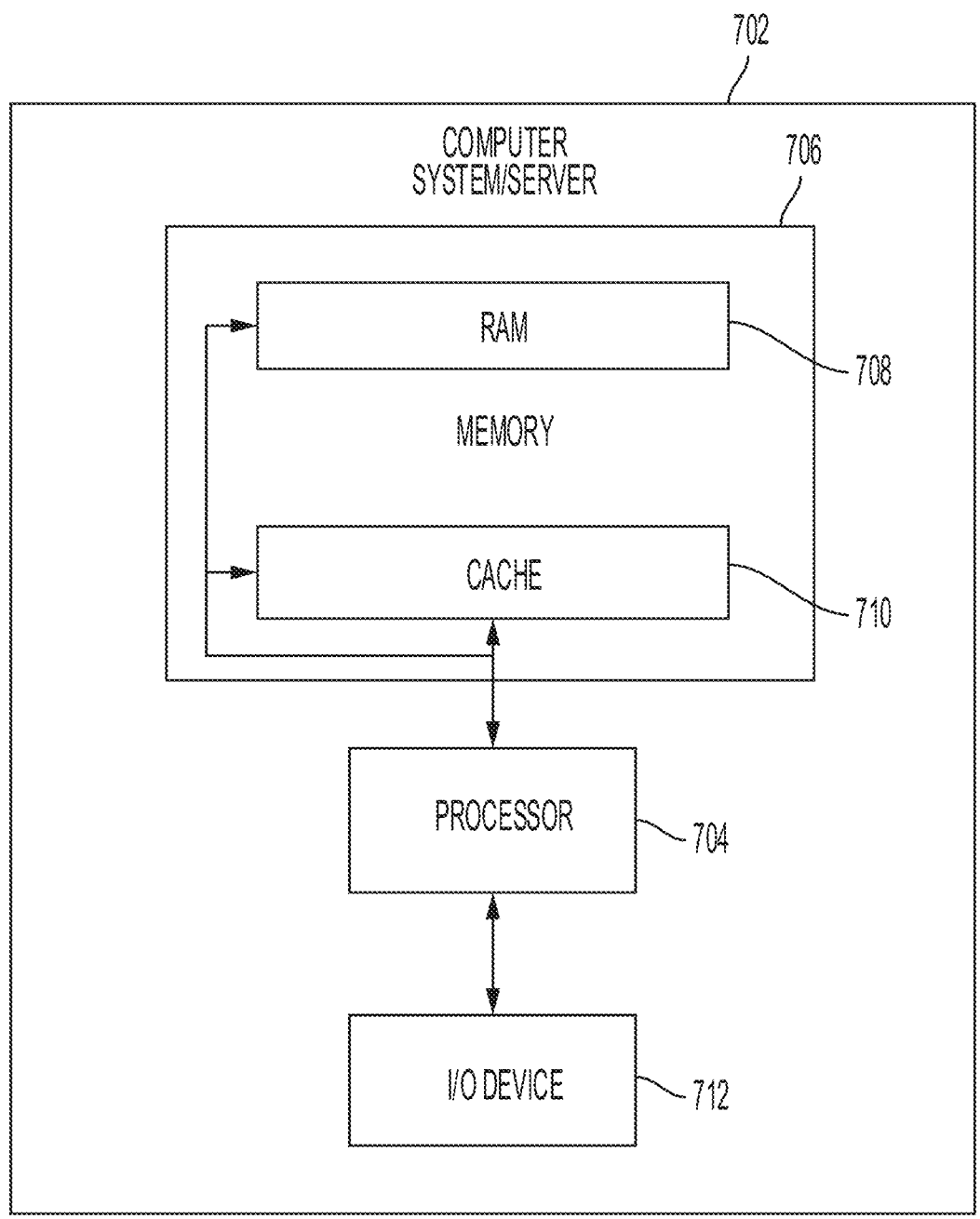
FIG. 7 illustrates an example system that supports one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 708 and/or cache memory 710. Computer system/server 702 may further include other removable/non-removable, volatile/non-volatile computer system storage media. By way of example only, memory 706 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility, having a set (at least one) of program modules, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices via an I/O device 712 (such as an I/O adapter), which may include a keyboard, a pointing device, a display, a voice recognition module, etc., one or more devices that enable a user to interact with computer system/server 702, and/or any devices (e.g., network card, modem, etc.) that enable computer system/server 702 to communicate with one or more other computing devices. Such communication can occur via I/O interfaces of the device 712. Still yet, computer system/server 702 can communicate with one or more networks such as a local area network (LAN), a general wide area network (WAN), and/or a public network (e.g., the Internet) via a network adapter. As depicted, device 712 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    receiving, by a hardware-implemented server, primary data related to the transport from a primary device located in an interior of the transport;
    receiving, by the hardware-implemented server, secondary data related to the transport from a plurality of secondary devices remote from the transport;
    identifying, by the hardware-implemented server, an occurrence of an event associated with the transport based on the primary data and the secondary data;
    identifying, by the hardware-implemented server, a severity of the event based on the primary data and on a consensus regarding the secondary data provided by a majority of the plurality of secondary devices being within a certain range corresponding to the severity of the event; and
    sending, by the hardware-implemented server, a first notification to the primary device and a second notification containing content that is different than a content of the first notification to the plurality of secondary devices; and
    sending, by the hardware-implemented server, an instruction to the transport to autonomously take an action based on the severity of the event.

2. The method of claim 1, wherein the primary data and the secondary data comprises:
    sensor data relating to anomalous behavior of the transport from the plurality of devices.

3. The method of claim 1, wherein the identifying a severity of the event further comprises:
    identifying the consensus when the secondary data provided by a majority of the plurality of secondary devices is within a common range corresponding to the severity of the event.

4. The method of claim 1, further comprising:
    identifying, by the hardware-implemented server, a state of the transport based on data collected by each secondary device, of the plurality of secondary devices, at a particular time,
    wherein the state is related to the event, and
    wherein a degree of the secondary data relates to the severity of the event.

5. The method of claim 1, further comprising:
    identifying an action to take based on the severity, the action comprising at least one of:
        notifying the transport in response to the severity of the event is low;
        notifying the plurality of devices in response to the severity of the event is moderate; and
        contacting one or more first responders in response to the severity of the event is high.

6. The method of claim 1, comprising:
    creating, by the hardware-implemented server, a blockchain transaction based on a smart contract and one or more of:
        the primary data;
        the secondary data;
        a location of the plurality of secondary devices;
        a type of the plurality of secondary devices;
        times of receipt of the secondary data;
        a type of the severity of the event; and
        a type of the action to take; and
    storing, by the hardware-implemented server, the blockchain transaction in a blockchain ledger based on a smart contract.

7. A hardware-implemented server, comprising:
    a memory storing one or more instructions; and
    a processor that when executing the one or more instructions is configured to:
        receive primary data related to a transport from a primary device located in an interior of the transport;
        receive secondary data related to the transport from a plurality of secondary devices remote from the transport;
        identify an occurrence of an event associated with the transport based on the primary data and the secondary data;
        identify a severity of the event based on the primary data and on a consensus regarding the secondary data provided by a majority of the plurality of secondary devices being within a certain range corresponding to the severity of the event; and send a first notification to the primary device and a second notification containing content that is different than a content of the first notification to the plurality of secondary devices; and sending an instruction to the transport to autonomously take an action based on the severity of the event.

8. The hardware-implemented server of claim 7, wherein the primary data and the secondary data comprises:

sensor data relating to anomalous behavior of the transport from the plurality of devices.

9. The hardware-implemented server of claim 7, wherein, when the processor is configured to identify a severity of the event, the processor is further configured to:

identify the consensus when the secondary data provided by a majority of the plurality of secondary devices is within a common range corresponding to the severity of the event.

10. The hardware-implemented server of claim 7, wherein the processor is further configured to:

identify a state of the transport based on data collected by each secondary device, of the plurality of secondary devices, at a particular time, wherein the state is related to the event, and wherein a degree of the secondary data relates to the severity of the event.

11. The hardware-implemented server of claim 7, wherein the processor is further configured to:

identify an action to take based on the severity, wherein the action comprises at least one of:

notify the transport in response to the severity of the event is low;

notify the plurality of devices in response to the severity of the event is moderate; and contact one or more first responders in response to the severity of the event is high.

12. The hardware-implemented server of claim 7, wherein the processor is configured to:

create a blockchain transaction based on a smart contract and one or more of:

the primary data;

the secondary data;

a location of the plurality of secondary devices;

a type of the plurality of secondary devices;

times of receipt of the secondary data;

a type of the severity of the event; and a type of the action to take; and store the blockchain transaction in a blockchain ledger based on a smart contract.

13. A non-transitory computer readable medium comprising one or more instructions that when executed by a processor of a server cause the processor to perform:

receiving primary data related to the transport from a primary device located in an interior of the transport;

receiving secondary data related to the transport from a plurality of secondary devices remote from the transport;

identifying an occurrence of an event associated with the transport based on the primary data and the secondary data;

identifying a severity of the event based on the primary data and on a consensus regarding the secondary data provided by a majority of the plurality of secondary devices being within a certain range corresponding to the severity of the event; and sending a first notification to the primary device and a second notification containing content that is different than a content of the first notification to the plurality of secondary devices; and sending an instruction to the transport to autonomously take an action based on the severity of the event.

14. The non-transitory computer readable medium of claim 13, wherein the primary data and the secondary data comprises:

sensor data relating to anomalous behavior of the transport from the plurality of devices, and wherein the identifying a severity of the event further comprises:

identifying the consensus when the secondary data provided by a majority of the plurality of secondary devices is within a common range corresponding to the severity of the event.

15. The non-transitory computer readable medium of claim 13, wherein the one or more instructions further causes the processor to perform:

identifying a state of the transport based on data collected by each secondary device, of the plurality of secondary devices, at a particular time, wherein the state is related to the event, and wherein a degree of the secondary data relates to the severity of the event.

16. The non-transitory computer readable medium of claim 13, wherein the one or more instructions further causes the processor to perform:

identifying an action to take based on the severity, the action comprising at least one of:

notifying the transport in response to the severity of the event is low;

notifying the plurality of devices in response to the severity of the event is moderate; and contacting one or more first responders in response to the severity of the event is high.

17. The non-transitory computer readable medium of claim 13, wherein the one or more instructions further cause the processor to perform:

creating, by the hardware-implemented server, a blockchain transaction based on a smart contract and one or more of:

the primary data;

the secondary data;

a location of the plurality of secondary devices;

a type of the plurality of secondary devices;

times of receipt of the secondary data;

a type of the severity of the event; and a type of the action to take; and storing, by the hardware-implemented server, the blockchain transaction in a blockchain ledger based on a smart contract.

\* \* \* \* \*